United States Patent [19]
Yaso et al.

[11] Patent Number: 5,434,983
[45] Date of Patent: Jul. 18, 1995

[54] DATA PROCESSING APPARATUS HAVING FIRST BUS WITH BUS ARBITRATION INDEPENDENT OF CPU, SECOND BUS FOR CPU, AND GATE BETWEEN FIRST AND SECOND BUSES

[75] Inventors: Kenji Yaso; Takashi Hagiwara, both of Kawasaki, Japan

[73] Assignee: Fujitsu Limited, Kawasaki, Japan

[21] Appl. No.: 936,945

[22] Filed: Aug. 28, 1992

[30] Foreign Application Priority Data

Aug. 30, 1991 [JP] Japan .................................. 3-220556

[51] Int. Cl.⁶ ............................................. G06F 13/36
[52] U.S. Cl. ................................... 395/325; 358/442; 370/85.2; 364/240; 364/240.2; 364/240.5; 364/240.7; 364/241.9; 364/242.6; 364/242.92; 364/DIG. 1
[58] Field of Search ............... 395/325, 275, 425, 800, 395/725, 200; 340/825.5; 370/85.2; 364/514; 358/442

[56] References Cited

U.S. PATENT DOCUMENTS

| | | | |
|---|---|---|---|
| 4,453,214 | 6/1984 | Adcock | 395/425 |
| 4,494,193 | 1/1985 | Brahm et al. | 395/200 |
| 4,503,496 | 3/1985 | Holzner et al. | 395/425 |
| 4,706,126 | 11/1987 | Kondo | 358/426 |
| 4,737,932 | 4/1988 | Baba | 395/325 |
| 4,751,634 | 6/1988 | Burrus, Jr. et al. | 395/275 |
| 4,868,741 | 9/1989 | Gula et al. | 395/325 |
| 4,975,838 | 12/1990 | Mizuno et al. | 395/275 |
| 5,118,970 | 6/1992 | Olson et al. | 307/443 |
| 5,142,672 | 8/1992 | Johnson et al. | 395/500 |
| 5,191,656 | 3/1993 | Forde, III et al. | 395/325 |
| 5,239,636 | 8/1993 | Dujari et al. | 395/425 |
| 5,303,067 | 4/1994 | Kang et al. | 358/442 |
| 5,309,567 | 5/1994 | Mizukami | 395/325 |

FOREIGN PATENT DOCUMENTS 60-136880  7/1985  Japan ........................... G06F 15/62

*Primary Examiner*—Gopal C. Ray
*Attorney, Agent, or Firm*—Staas & Halsey

[57] ABSTRACT

An image processing apparatus containing a first bus, a second bus, a CPU connected to the first bus, a plurality of bus user units respectively connected to the second bus, a bus control unit connected with each of the plurality of bus user units and the CPU, and a bus connect-/isolate gate unit connected with the first and second buses and the bus control unit. Each of the plurality of bus user units and the CPU contains a bus request signal sending unit for sending a bus request signal to the bus control unit when each of the plurality of bus user units and the CPU has a demand to use the second bus. The bus connect/isolate gate unit can isolate the first bus from the second bus, or connect the first bus with the second bus, under control of the bus control unit. The bus control unit receives the bus request signal from each of the plurality of bus user units and the CPU, determines one of the plurality of bus user units and the CPU, which sends the bus request signal to the bus control unit, as an acknowledged unit, sends an acknowledge signal to the acknowledged unit, makes the bus connect/isolate gate connect the first bus with the second bus when the CPU is the acknowledged unit, and makes the bus connect/isolate gate isolate the first bus from the second bus when the CPU is not the acknowledged unit.

8 Claims, 14 Drawing Sheets

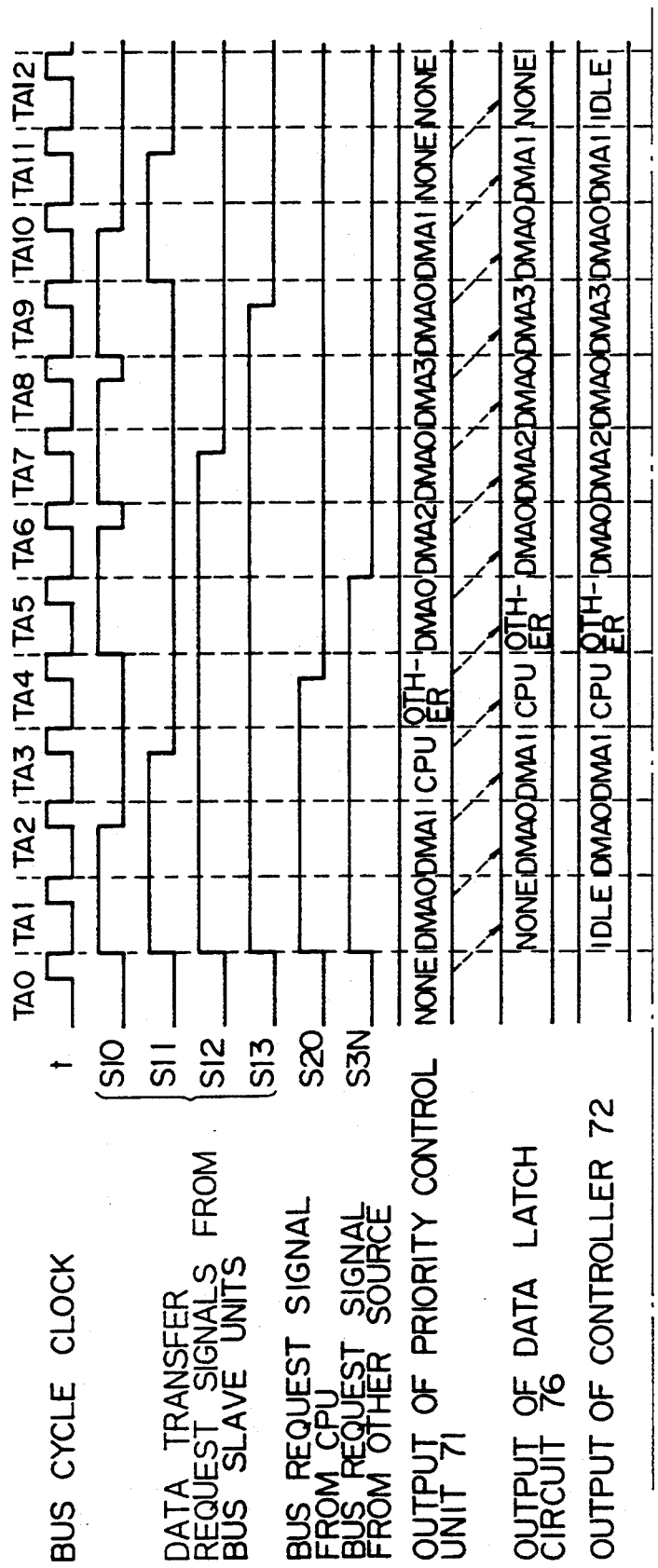

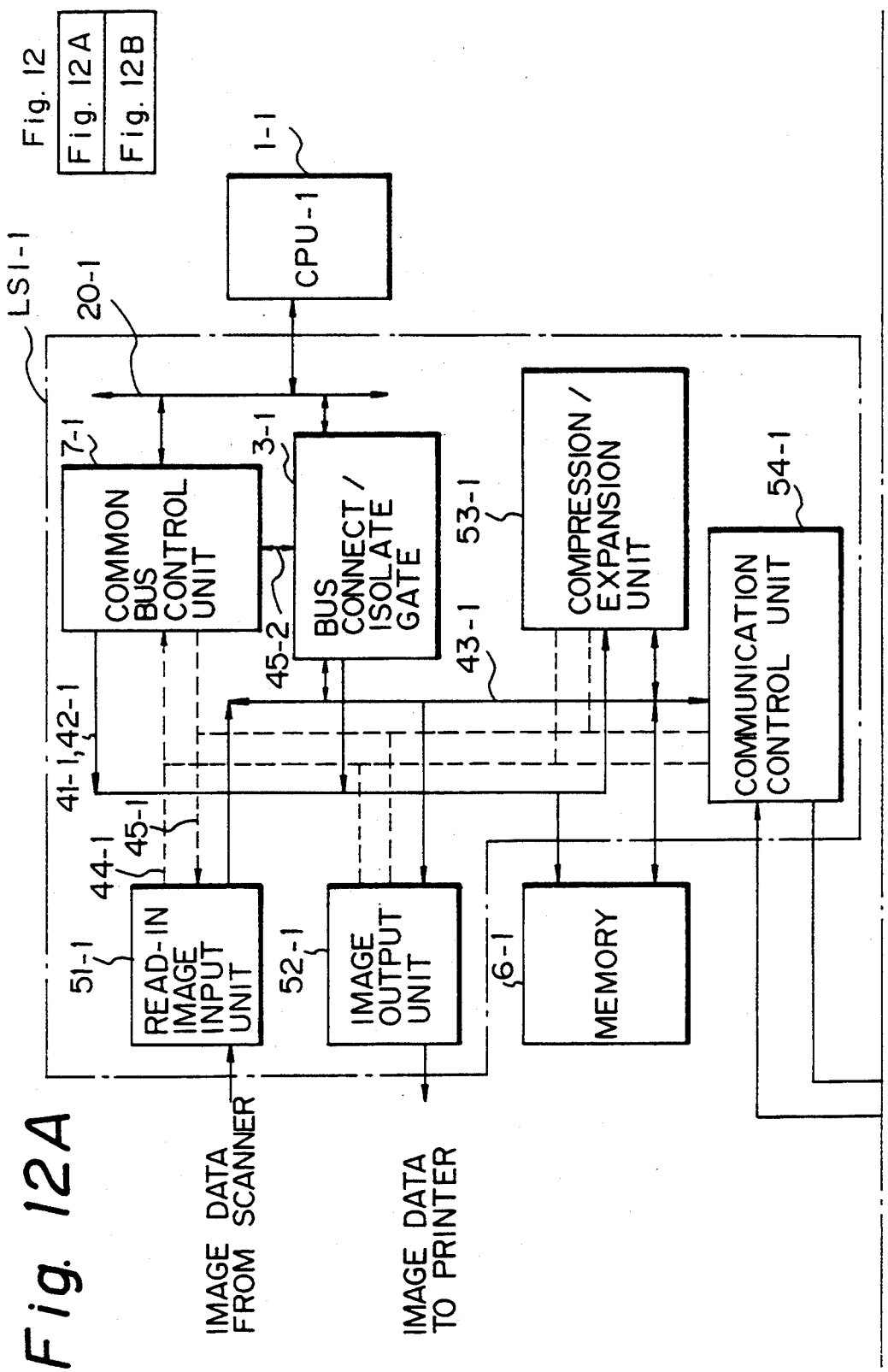

DATA PROCESSING APPARATUS HAVING FIRST BUS WITH BUS ARBITRATION INDEPENDENT OF CPU, SECOND BUS FOR CPU, AND GATE BETWEEN FIRST AND SECOND BUSES

BACKGROUND OF THE INVENTION (1) Field of the Invention

The present invention relates to an image processing apparatus containing at least one bus, a central processing unit and a plurality of units each may request use of one of the bus or a data transfer among the plurality of units using the bus. The present invention relates, in particular, to a facsimile terminal apparatus wherein image data written or printed on paper is read, encoded, and transmitted, and image data transmitted to the facsimile terminal apparatus is received, decoded, and output through a printer.

(2) Description of the Related Art

Since transfer operations of a large amount of image data must be carried out in an image processing apparatus as above, DMA (Direct Memory Access) transfer operations are utilized in the image processing apparatus, whereby a CPU (Central Processing Unit) is not required to directly control the transfer operations of the image data.

FIG. 1 is a block diagram illustrating a conventional construction of a facsimile terminal apparatus. In FIG. 1, reference numeral 1' denotes a CPU, 6' denotes a memory, 8 denotes a DMA controller, 11' denotes a ROM (Read Only Memory) for storing firmware for the operation of the CPU 1', 20' denotes a bus, 21' denotes an address bus in the bus 20', 22' denotes a control signal bus in the bus 20', 23' denotes a data bus in the bus 20', a1 denotes control signal lines for transmitting data transfer request signals, b1 denotes control signal lines for transmitting bus acknowledge signals, c1 denotes control signal lines for transmitting a bus-request-to-CPU signal, d1 denotes control signal lines for transmitting a bus-acknowledge-from-CPU signal, 51 denotes a read-in image input unit, 52 denotes an image output unit, 53 denotes a compression/expansion unit, 54 denotes a communication control unit, and 55 denotes a MODEM Modulation/Demodulation Unit In the construction of FIG. 1, generally, each of the read-in image input unit 51, the image output unit 52, the compression/expansion unit 53, and the communication control unit 54 may have a demand to transmit or receive image data through the bus 20' by carrying out a data transfer operation between each unit and the memory 6'. Since the data transfer operation is performed under control of the DMA controller 8 as explained below, each of the read-in image input unit 51, the image output unit 52, the compression/expansion unit 53, and the communication control unit 54 is a bus slave unit. Each of the bus slave units sends a data transfer request signal to the DMA controller 8 when the bus slave unit has a demand to transmit or receive image data through the bus 20'. Arbitration among the data transfer request signals from the bus slave units is carried out as follows. The DMA controller 8 can receive data transfer request signals from the bus slave units. At each bus cycle (the bus cycle is predetermined as a duration having a length equal to an integer multiple of a cycle time of a system clock), the DMA controller 8 determines whether or not at least one of the data transfer request signals respectively sent from the above bus slave units is active. When yes is determined, the DMA controller 8 determines one of the bus slave units which sent the at least one of the active data transfer request signals in the bus cycle, as a provisional data transfer acknowledged unit. Then, the DMA controller 8 sends the bus-request-to-CPU signal to the CPU 1' through the control signal line c1 for requesting a data transfer through the bus 20' by the above provisional data transfer acknowledged unit. Receiving the bus-request-to-CPU signal, the CPU 1' sends the bus-acknowledge-from-CPU signal to the DMA controller 8 through the control signal line d1 when the CPU needs not use the bus 20'. Receiving the bus-acknowledge-from-CPU signal, the DMA controller 8 sends an active bus acknowledge signal to the provisional data transfer acknowledged unit (the above determined bus slave unit) through one of the control signal lines b1 to inform that the data transfer request for requesting a data transfer through the bus 20' between the memory 6' and the determined bus slave unit is acknowledged. Thus, the transfer of image data between the bus slave unit and the memory 6' can be performed under control of the DMA controller 8.

In the facsimile terminal apparatus of FIG. 1, an image on paper is read by an optical scanner (not shown), and is input to the read-in image input unit 51. The data of the image is once held in a first buffer register (not shown) in the read-in image input unit 51. When the amount of the image data held in the first buffer register reaches a predetermined amount, the read-in image input unit 51 sends an active data transfer request signal to the DMA controller 8 for requesting a transfer of the image data held therein to the memory 6'. When the transfer through the bus 20' is acknowledged as explained above, the image data is transferred from the read-in image input unit 51 to a read-in data storing area in the memory 6 through the bus 20' by the DMA mode under control of the DMA controller 8. The CPU 1' monitors an amount of image data stored in the read-in data storing area in the memory 6'. When the CPU 1' detects a state of the memory 6' wherein the amount of image data stored in the read-in data storing area reaches a predetermined amount, the CPU 1' sends a compression command to the compression/expansion unit 53. Receiving the compression command, the compression/expansion unit 53 sends an active data transfer request signal (image data input request signal) to the DMA controller 8 for requesting to transfer the image data stored in the read-in data storing area in the memory 6', to the compression/expansion unit 53 through the bus 20'. When the request is granted through the arbitration as above, the DMA controller 8 sends an active data transfer acknowledge signal (image data input acknowledge signal) corresponding to the image data input request signal, to the compression/expansion unit 53, and the image data stored in the read-in data storing area in the memory 6', is transferred to the compression/expansion unit 53 through the bus 20' by the DMA mode under control of the DMA controller 8. The compression/expansion unit 53 receives and compresses (encodes) the transferred image data. The compressed image data is once held in a second buffer register in the compression/expansion unit 53. When the amount of the compressed image data in the second buffer register reaches a predetermined amount, the compression/expansion unit 53 sends an active data transfer request signal (compressed image data output request signal) to the DMA controller 8 for requesting a transfer of the image data compressed and held in the second buffer register in the compression/expansion unit 53, to a transmission image data storing area in the memory 6', through the bus 20'. When the request is acknowledged through the arbitration, the DMA controller 8 sends an active data transfer acknowledge signal (compressed image data transfer acknowledge signal) to the compression/expansion unit 53, and the image data held in the second buffer register in the compression/expansion unit 53, is transferred, as transmission image data, to the transmission image data storing area in the memory 6. In addition, every time the transfer operation of the compressed image data corresponding to image data which is scanned by the above scanner from one sheet of paper, to the transmission image data storing area in the memory 6', is completed, the compression/expansion unit 53 sends an interrupt signal to the CPU 1' to inform of the completion of the transfer of the compressed image data of one sheet of paper. Receiving the interrupt signal, the CPU 1' transfers information to be transmitted with the transmission image data through the bus 20' to the memory 6', and forms on the memory 6' a transmission frame containing the information and the transmission image data, in accordance with a predetermined communication protocol. Then, the CPU 1' sends a transmission command to the communication control unit 54. Receiving the transmission command, the communication control unit 54 sends an active data transfer request signal to the DMA controller 8 for requesting to transmit the image data through the bus 20' from the memory 6' to the communication control unit 54. When the request is acknowledged, the DMA controller 8 sends an active data transfer acknowledge signal to the communication control unit 54, and the transmission frame is transferred from the memory 6' to the communication control unit 54 through the bus 20' by the DMA mode under control of the DMA controller 8. Then, the communication control unit 54 receives the transmission frame, and transmits the transmission frame through the MODEM 55, in accordance with the predetermined communication protocol.

When receiving a transmission frame containing compressed image data through the MODEM 55, the received image data is transferred by the DMA mode under control of the DMA controller 8 after similar arbitration, from the communication control unit 54 to the memory 6', and from the memory 6' to the compression/expansion unit 53. The image data is expanded in the compression/expansion unit 53, and is then transferred by the DMA mode under control of the DMA controller 8 after similar arbitration, from the compression/expansion unit 53 to the memory 6', and from the memory 6' to the image output unit 52, to output the expanded image data in a printed form through the printer.

However, the conventional facsimile terminal apparatus has the following two problems. The first problem is that the requests for transferring image data through the bus 20' and requests for use of the bus 20' by the CPU 1' occur very frequently because all the bus slave units and the CPU 1' are connected to the single bus 20'. Therefore, the acknowledgment through the arbitration may be frequently delayed due to competition among more than one data transfer request signal at one bus cycle. The second problem is that the above arbitration process includes two stages: one stage is the above process of determining the provisional data transfer acknowledged unit in the DMA controller 8 when receiving at least one active data transfer request signal from the bus slave units; and the other stage is the process, executed in the CPU 1', of granting the use of the bus by the DMA controller 8.

FIG. 2 is a timing diagram of an example operation of the facsimile terminal apparatus of FIG. 1. In FIG. 2, in the bus cycle TA1, the data transfer request signals S10 and S1N become active. Receiving these active data transfer request signals S10 and S1N, the DMA controller 8 determines the bus slave unit which sends the active data transfer request signal S10, as the provisional data transfer acknowledged unit, and sends the bus-request-to-CPU signal to the CPU 1' through the control signal line c1 in the bus cycle TA2. Receiving the bus-request-to-CPU signal, the CPU 1' determines to grant the use of the bus 20' by the DMA controller 8, and returns the bus-acknowledge-from-CPU signal to the DMA controller 8 through the control signal line d1 in the bus cycle TA3. Receiving the bus-acknowledge-from-CPU signal, the DMA controller 8 sends an active data transfer acknowledge signal S40 to the above bus slave unit which sends the active data transfer request signal S10, in the bus cycle TA4. Thus, a DMA transfer between the bus slave unit and the memory 6' is carried out three bus cycles after the bus slave unit sends the data transfer request signal to the DMA controller 8. Namely, the arbitration is delayed because the bus arbitration process is comprised of the above two stages. In addition, since the CPU 1' is involved in every arbitration process at the above second stage, the load imposed on the CPU 1' is heavy. This also causes a delay in a total image data processing operation of the facsimile terminal apparatus.

The above first problem exists in every image processing apparatus, other than the facsimile terminal apparatus, containing a plurality of units, wherein image data is transferred among the plurality of units inside the image processing apparatus when the CPU of the image processing apparatus and all the plurality of bus slave units are connected to a single bus. In addition, the above second problem exists in every image processing apparatus, other than the facsimile terminal apparatus, containing a plurality of bus slave units, wherein image data is transferred among the plurality of bus slave units inside the image processing apparatus when the arbitration among more than one data transfer requests from the plurality of bus slave units is carried out in two stages in a DMA controller and a CPU of the image processing apparatus.

SUMMARY OF THE INVENTION

An object of the present invention is to provide an image processing apparatus containing a plurality of units, wherein image data is transferred among the plurality of units through at least one bus inside the image processing apparatus, and wherein a frequency of occurrences of requests for use of each of the at least one bus is reduced, a load imposed on a CPU controlling the image processing apparatus is reduced, and arbitration among more than one bus requests from the plurality of units can be performed quickly.

According to the first aspect of the present invention, there is provided an image processing apparatus containing a first bus, a second bus, a central processing unit connected to the first bus, a plurality of bus user units respectively connected the second bus, a second-bus control unit connected with each of the plurality of bus user units and the central processing unit, and a bus connect/isolate gate unit connected with the first and second buses and the second-bus control unit. Each of the plurality of bus user units and the central processing unit contains a bus request signal sending unit for sending a bus request signal to the second-bus control unit when each of the plurality of bus user units and the central processing unit has a demand to use the second bus. The bus connect/isolate gate unit can isolate the first bus from the second bus, or connect the first bus with the second bus, under control of the second-bus control unit. The second-bus control unit contains: a bus request signal receiving unit for receiving the bus request signal from each of the central processing unit and the plurality of bus user units; an acknowledged unit determining unit for determining one of the central processing unit and the plurality of bus user units, which sends the bus request signal to the second-bus control unit, as the acknowledged unit; an acknowledge signal sending unit for sending a bus acknowledge signal to the acknowledged unit; and a gate control unit for making the bus connect/isolate gate connect the first bus with the second bus when the central processing unit is the acknowledged unit, and making the bus connect/isolate gate isolate the first bus from the second bus when the central processing unit is not the acknowledged unit.

According to the second aspect of the present invention, there is provided an image processing apparatus contains a first bus, a second bus, a central processing unit connected to the first bus, a plurality of bus slave units respectively connected the second bus, a memory unit, connected the second bus, for storing data, a second-bus control unit connected with each of the plurality of bus slave units and the central processing unit, a bus connect/isolate gate unit connected with the first and second buses and the second-bus control unit, and a DMA control unit. The central processing unit contains a bus request signal sending unit for sending a bus request signal to the second-bus control unit when the central processing unit has a demand to use the second bus. Each of the plurality of bus slave units contains a data transfer request signal sending unit for sending a data transfer request signal to the second-bus control unit when each of the plurality of bus slave units has a demand to transmit or receive data through the second bus. The bus connect/isolate gate unit being able to isolate the first bus from the second bus, or to connect the first bus with the second bus, under control of the second bus control unit. The second-bus control unit contains a request signal receiving unit for receiving the bus request signal from the central processing unit and the data transfer request signals from the plurality of bus slave units; an acknowledged unit determining unit for determining one of the central processing unit which sends the bus request signal and the plurality of bus slave units which sends the data transfer request signal, as an acknowledged unit; an acknowledge signal sending unit for sending an acknowledge signal to the acknowledged unit; and a gate control unit for making the bus connect/isolate gate connect the first bus with the second bus when the central processing unit is the acknowledged unit, and making the bus connect/isolate gate isolate the first bus from the second bus when the central processing unit is not the acknowledged unit. The DMA control unit for controlling the memory unit so that data transfer between the memory unit and the acknowledged unit is performed through the second bus by a direct memory access operation when the acknowledged unit determining unit determines one of the slave units as the acknowledged unit.

BRIEF DESCRIPTION OF THE DRAWINGS

In the drawings:

FIGS. 10A and 10B indicate a timing diagram of the control of the common bus 40;

FIGS. 12A and 12B are a diagram illustrating the construction of the second embodiment of the present invention.

Figure 3:
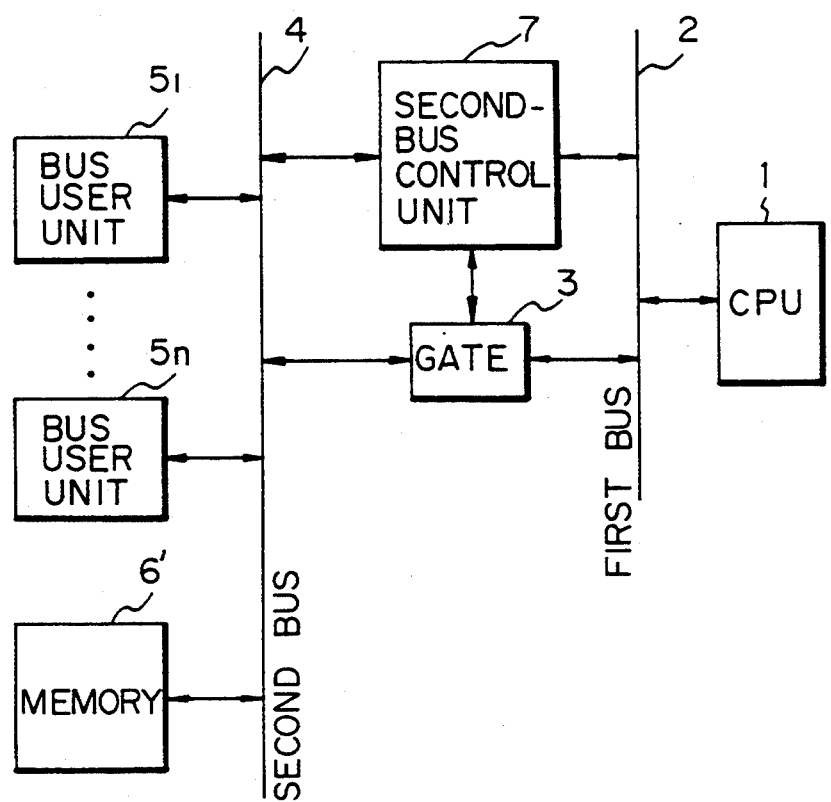
FIG. 3 is a diagram showing the basic construction of an image processing apparatus according to the present invention.

DESCRIPTION OF THE PREFERRED EMBODIMENTS (1) Basic Construction and Operation (FIG. 3)

FIG. 3 is a diagram showing the basic construction of an image processing apparatus according to the present invention. In FIG. 3, reference numeral 1 denotes a CPU, 2 denotes a first bus, 3 denotes a bus connecting gate, 4 denotes a second bus, $5_1$ to $5_n$ each denote a bus user unit, 6 denote a memory, and 7 denotes a second-bus control unit.

In the construction of FIG. 3, each of the plurality of bus user units $5_1$ to $5_n$ are connected to the second bus 4, and may have a demand to use the second bus 4, in particular, for carrying out a data transfer operation between each bus user unit and the memory 6. When each of the plurality of bus user units $5_1$ to $5_n$ has the demand to use the second bus 4, the bus user unit sends a bus request signal to the second-bus control unit 7. The CPU 1 is connected to the first bus 2, and sends a bus request signal to the second-bus control unit 7 when the CPU 1 has a demand to use the second bus 4. The bus connect/isolate gate 3 is provided between the first and second buses 2 and 4, and isolates the first bus 2 from the second bus 4, or connects the first bus 2 with the second bus 4, under control of the second-bus control unit 7. The second-bus control unit 7 can receive the bus request signal from each of the plurality of bus user units 5₁ to 5ₙ and the CPU 1, and provides one of the plurality of bus user units 5₁ to 5ₙ and the CPU 1, which sends the bus request signal to the second-bus control unit 7, with a grant to use the second bus 4. When the grant is provided to the CPU 1, the second-bus control unit 7 makes the bus connect/isolate gate 3 connect the first bus 2 with the second bus 4, so that the CPU 1 can directly access the second bus 4.

According to the present invention (the construction of FIG. 3), first, the CPU 1 has the first bus 2 for its exclusive use, and therefore, the operations of the CPU accessing a ROM (Read Only Memory, not shown in FIG. 3) for storing firmware for the operation of the CPU 1, or a RAM (Random Access Memory) for use by the CPU 1, is not delayed by the data transfer operations between the memory 6 and the bus user units 5₁ to 5ₙ, and the data transfer operations between the memory 6 and the bus user units 5₁ to 5ₙ is not delayed by the operations of the CPU accessing the ROM and the RAM. Secondly, since the control of the use of the second bus 4 is centralized in the second-bus control unit 7, the control of the use of the second-bus 4 can be carried out quickly. In addition, due to the provision of the bus connect/isolate gate 3, the CPU 1 can access the second bus 4 directly.

Figure 4:
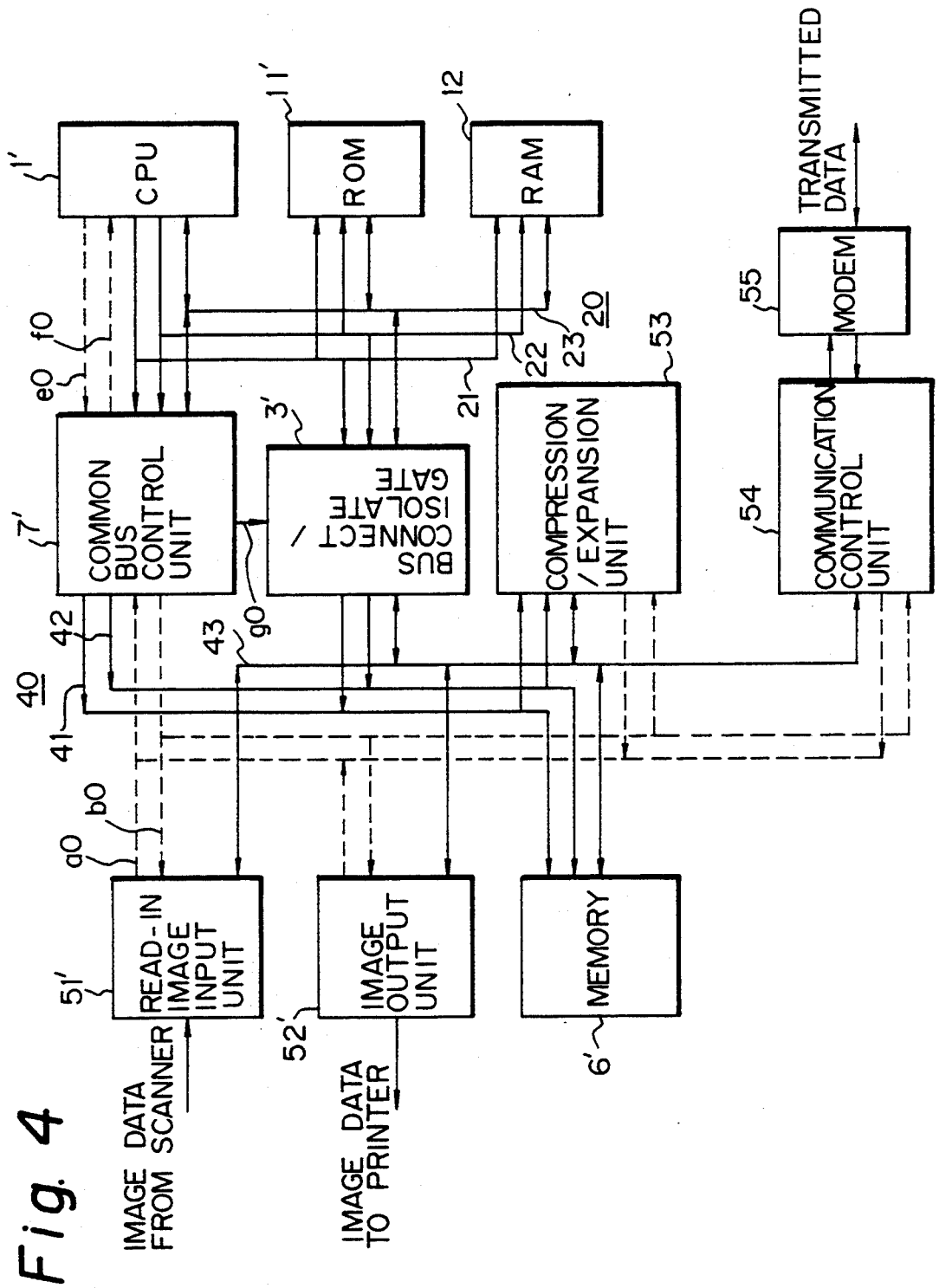
FIG. 4 is a diagram showing the construction of a facsimile terminal apparatus as the first embodiment of the present invention.

(2) First Embodiment (FIG. 4)

Figure 1:
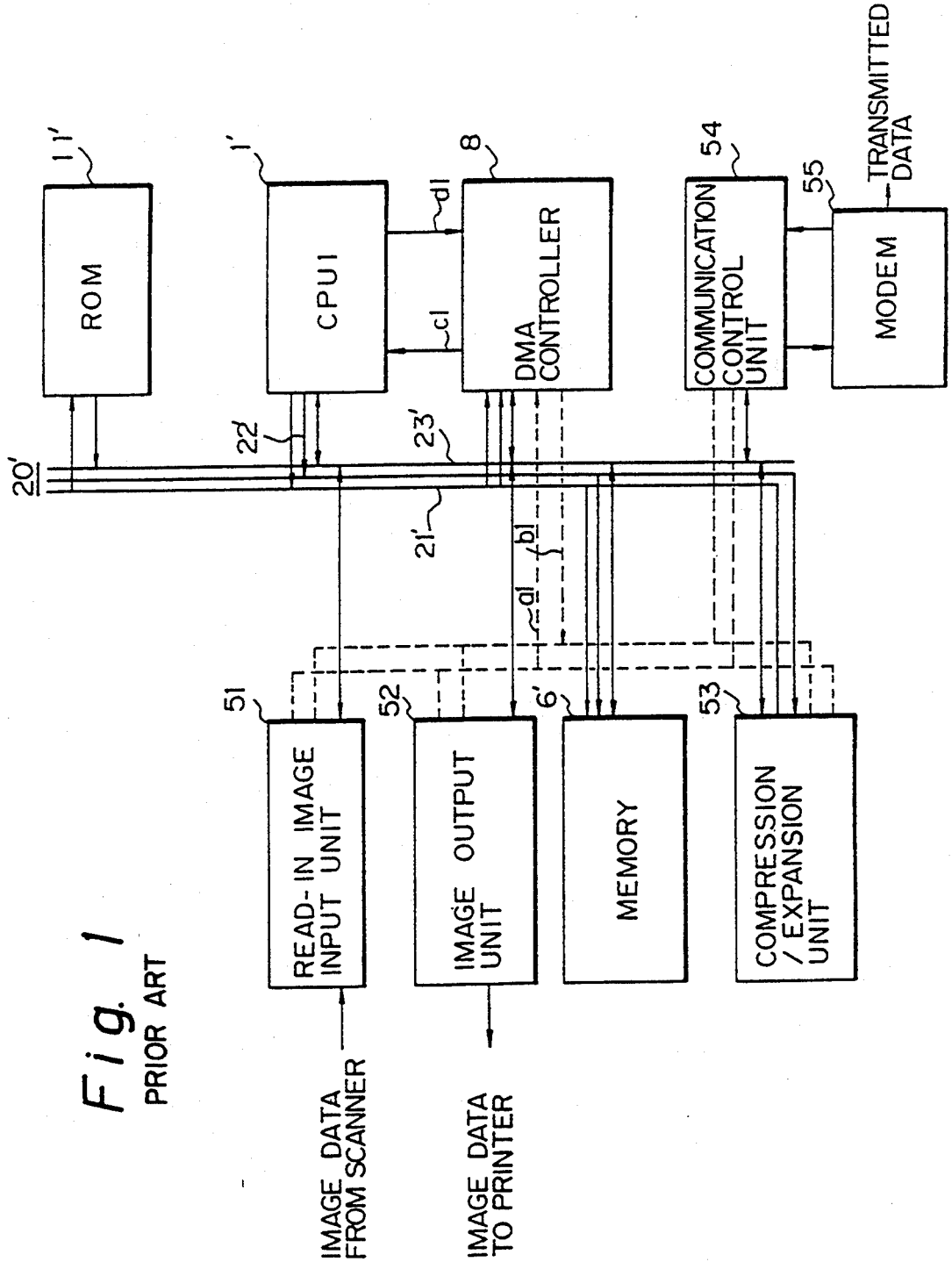
FIG. 1 is a block diagram illustrating a conventional construction of a facsimile terminal apparatus.
Figure 2:
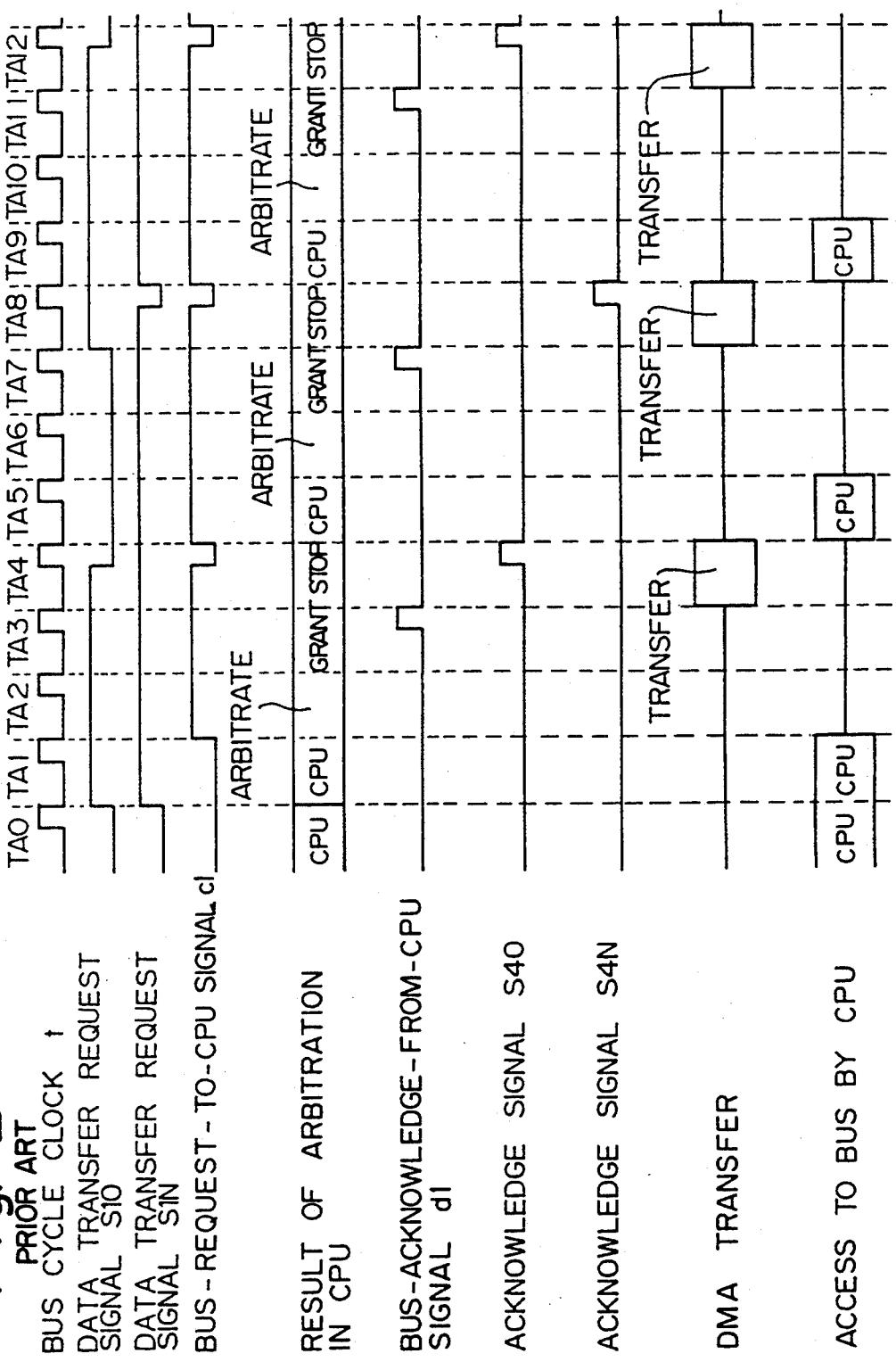
FIG. 2 is a timing diagram of an example operation of the facsimile terminal apparatus of FIG. 1.

FIG. 4 is a diagram showing the construction of a facsimile terminal apparatus as the first embodiment of the present invention. In FIG. 4, elements having the same reference numerals as FIG. 1 are respectively the same elements as FIG. 1. In FIG. 4, reference numeral 1 denotes a CPU, 3' denotes a bus connect/isolate gate, 6 denotes a memory (Random Access Memory), 7' denotes a common-bus control unit 7', 11 denotes a ROM (Read Only Memory) for storing firmware for the operation of the CPU 1, 12 denotes a RAM (Random Access Memory) for use by the CPU 1, 20 denotes a CPU bus, 21 denotes an address bus in the bus 20, 22 denotes a control signal bus in the bus 20, 23 denotes a data bus in the bus 20, 40 denotes a common bus, 41 denotes an address bus in the common bus 40, 42 denotes a control signal bus in the common bus 40, 43 denotes a data bus in the bus 40, a0 denotes control signal lines for transmitting data transfer request signals, b0 denotes control signal lines for transmitting acknowledge signals, e0 denotes a control signal line for transmitting a bus request signal from the CPU 1, f0 denotes a control signal line for transmitting an acknowledge signal to the CPU 1, and g0 denotes a control signal line from the common-bus control unit 7' to the bus connect/isolate gate 3'.

The construction of FIG. 4 corresponds to the construction of FIG. 3. The CPU bus 20 in FIG. 4 corresponds to the first bus 2 in FIG. 3, and the common bus 40 in FIG. 4 corresponds to the second bus 4 in FIG. 3. The read-in image input unit 51, the image output unit 52, the compression/expansion unit 53, and the communication control unit 54 in FIG. 4, correspond to the bus user units in FIG. 3, except that the read-in image input unit 51, the image output unit 52, the compression/expansion unit 53, and the communication control unit 54 in FIG. 4 are each a bus slave unit which does not control the common bus 40. As explained below, when a request for a data transfer from each slave unit is acknowledged by the common-bus control unit 7', the common bus 40 is used for transferring image data between the memory 6 and the slave unit under control of the common bus control unit 7'. In addition, the operations of the CPU 1 in the construction of FIG. 4 are the same as the CPU 1' in FIG. 1, except that the CPU 1 in FIG. 4 accesses each of the read-in image input unit 51, the image output unit 52, the compression/expansion unit 53, and the communication control unit 54 through the CPU bus 20, the bus connect/isolate gate 3', and the common bus 40 after the CPU 1 requests and obtains a grant for use of the common bus 40 from the common-bus control unit 7'. The operations of controlling the DMA transfer operations between the memory 6 and each of the read-in image input unit 51, the image output unit 52, the compression/expansion unit 53, and the communication control unit 54 are performed by the common-bus control unit 7' in FIG. 4, instead of the DMA controller 8 in FIG. 1.

The bus connect/isolate gate 3' can be realized by a plurality of one-way or two-way tri-state bus driver devices.

In addition, since the bus arbitration operation for the common bus 40 is carried out quickly according to the present invention, more than one compression/expansion unit may be connected to the common bus 40 so that the encoding and decoding operations can be concurrently carried out in the facsimile terminal apparatus.

Figure 5:
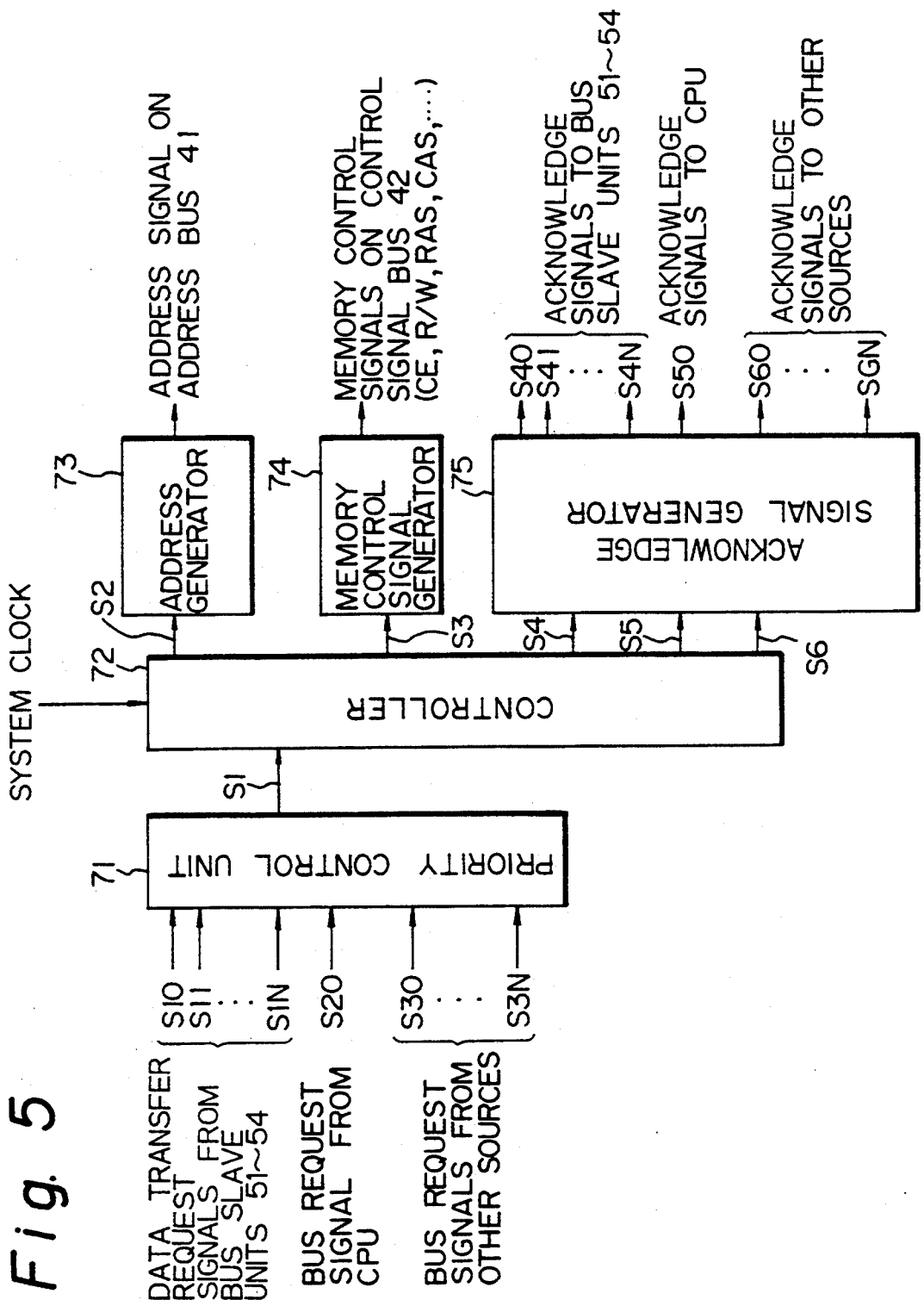
FIG. 5 is a block diagram of the construction of the common-bus control unit 7' in the construction of FIG. 4.

(3) Common Bus Control Unit (FIG. 5)

FIG. 5 is a block diagram of the construction of the common-bus control unit 7' in the construction of FIG. 4. In FIG. 5, reference numeral 71 denotes a priority control circuit, 72 denotes a controller, 73 denotes an address generator, 74 denotes a memory control signal generator, and 75 denotes an acknowledge signal generator. The priority control circuit 71 can receive request signals from a plurality of requesting sources. The plurality of requesting sources include the read-in image input unit 51, the image output unit 52, the compression/expansion unit 53, and the communication control unit 54, the CPU 1, and the other requesting sources. Namely, the priority control circuit 71 can receive data transfer request signals from the plurality of bus slave units (the read-in image input unit 51, the image output unit 52, the compression/expansion unit 53, and the communication control unit 54), and bus request signals from the CPU 1 and other requesting sources, for use of the common bus 40. As the other requesting sources, for example, a vector image processor may be connected to the common bus 40. In FIG. 5, S10 to S1N each denote a data transfer request signal for requesting to transfer data through the common bus 40 between the memory 6 and one of the bus slave units (the read-in image input unit 51, the image output unit 52, the compression/expansion unit 53, and the communication control unit 54), S20 denotes a bus request signal from the CPU 1 for requesting a grant for use of the common bus 40, S30 to S3N each denote a bus request signal for requesting a grant for use of the common bus 40 for a purpose other than the transfer of data between the memory 6 and one of the bus slave units, S40 to S4N denote acknowledge signals corresponding to the bus request signals S10 to S1N, respectively. At each bus cycle, the priority control circuit 71 determines one of the above plurality of requesting sources, as an acknowledged requesting source, based on a predetermined priority order. The output S1 of the priority control circuit 71 indicates the acknowledged requesting source, and is supplied to the controller 72. The controller 72 controls the address generator 73, the memory control signal generator 74, and the acknowledge signal generator 75, based on the output of the priority control circuit 71. In FIG. 5, S2 denotes a control signal for controlling the address generator 73, S3 denotes a control signal for controlling the memory control signal generator 74, and S4, S5, and S6 denote control signals for controlling the acknowledge signal generator 75, where the signal S4 contains information on the acknowledged requesting source among the read-in image input unit 51, the image output unit 52, the compression/expansion unit 53, and the communication control unit 54, the signal S5 becomes active when the use of the common bus 40 by the CPU 1 is granted, and the signal S5 contains information on the acknowledged requesting source among the above-mentioned other requesting sources.

The address generator 73 and the memory control signal generator 74 are provided for controlling DMA transfer operations performed through the common bus 40. The address generator 73 generates address signals used in the DMA data transfer operations carried out between the respective bus slave units and the memory 6, and may contain a plurality of address generator units provided for the respective bus slave units. The memory control signal generator 74 generates control signals for controlling the memory 6 including read/write signals (R/W), chip enable signals (CE), and the like. The acknowledge signal generator 75 generates and outputs an acknowledge signal at each bus cycle, to the above acknowledged requesting source. In FIG. 5, S40 to S4N denote the acknowledge signals sent to the respective bus slave units (the read-in image input unit 51, the image output unit 52, the compression/expansion unit 53, and the communication control unit 54), respectively corresponding to the above data transfer request signals S10 to S1N; S50 denotes an acknowledge signal to the CPU 1 for granting use of the common bus 40 by the CPU 1; and S60 to S6N denote acknowledge signals sent to the other requesting sources, respectively corresponding to the above bus request signals S30 to S3N. The acknowledge signal S50 is supplied to the bus connect/isolate gate 3 to control it. When the acknowledge signal S50 is active, the bus connect/isolate gate 3 connects the CPU bus 20 with the common bus 40 so that the CPU 1 can directly access the bus slave units connected with the common bus 40.

Figure 6:
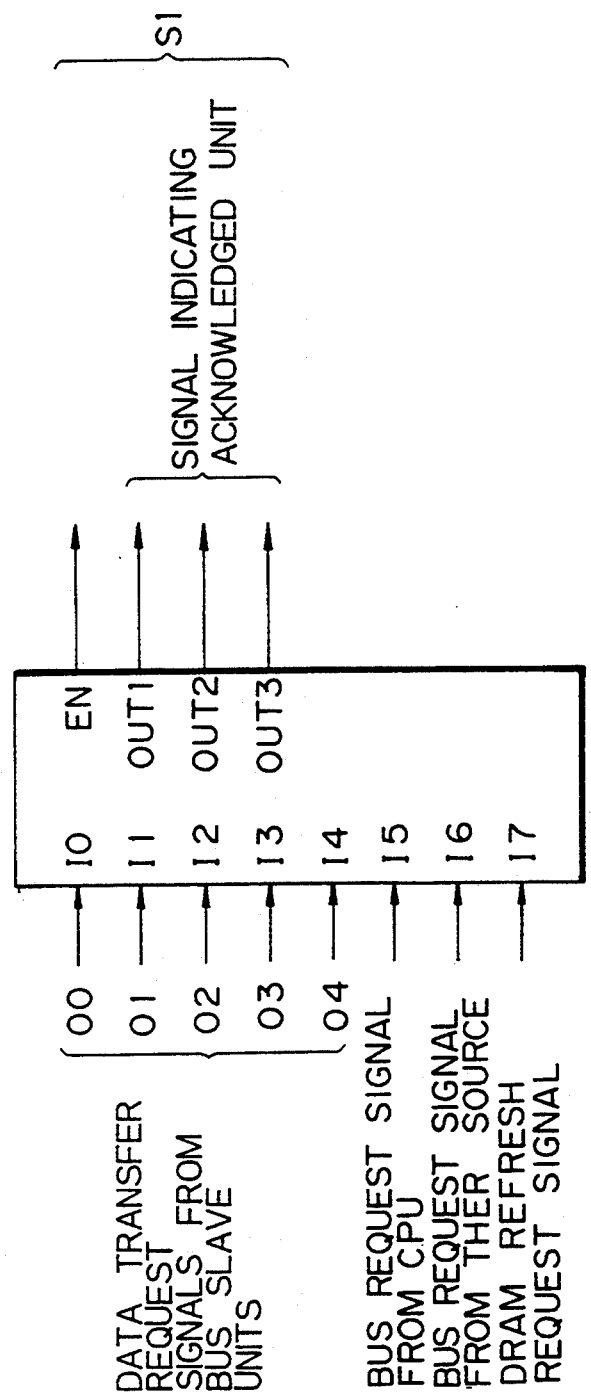
FIG. 6 is a block diagram of the construction of the priority control circuit 71 in the construction of FIG. 5.
Figure 7:
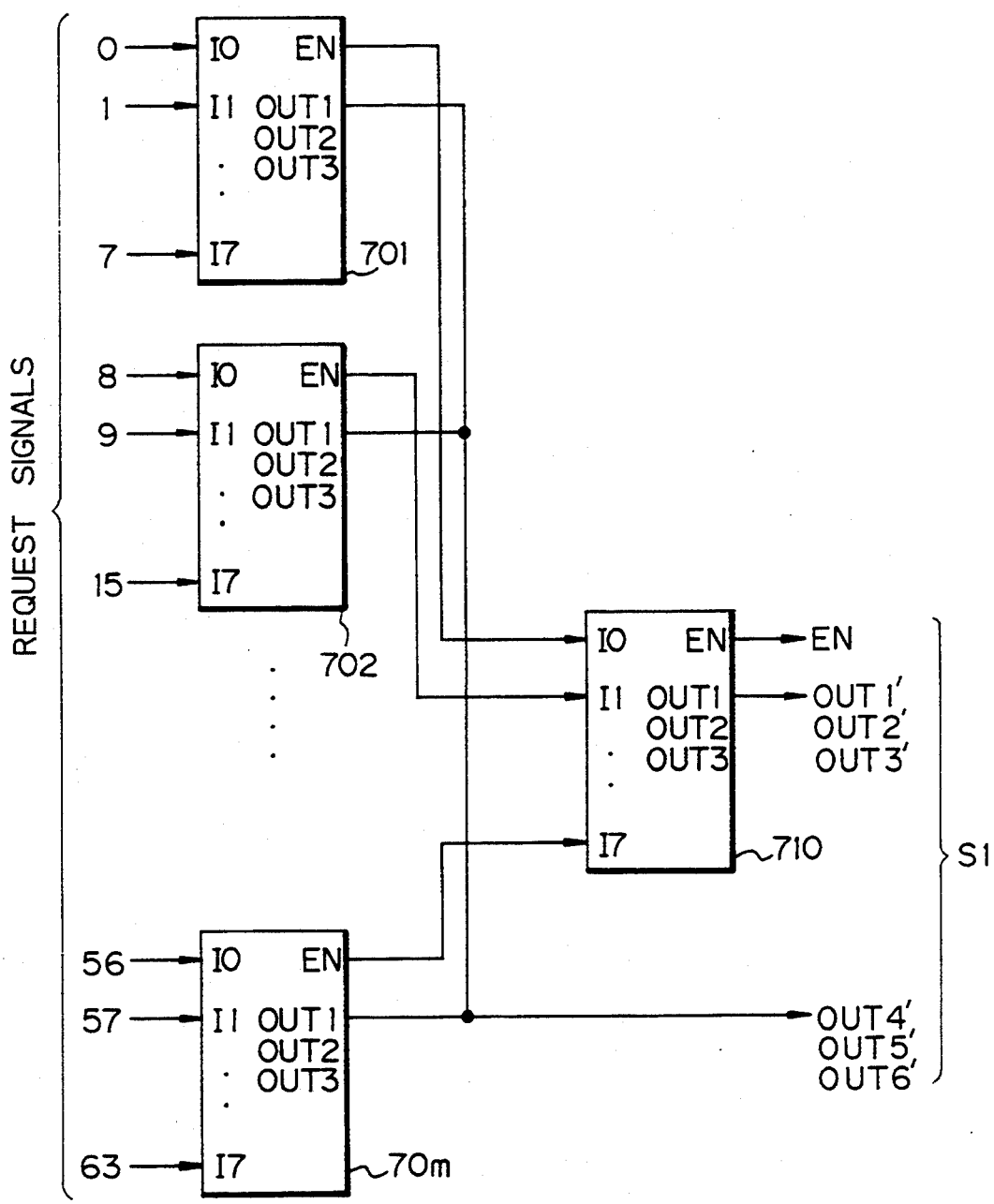
FIG. 7 is a diagram illustrating the construction of a priority control circuit constructed by a plurality of priority encoder devices.
Figure 8:
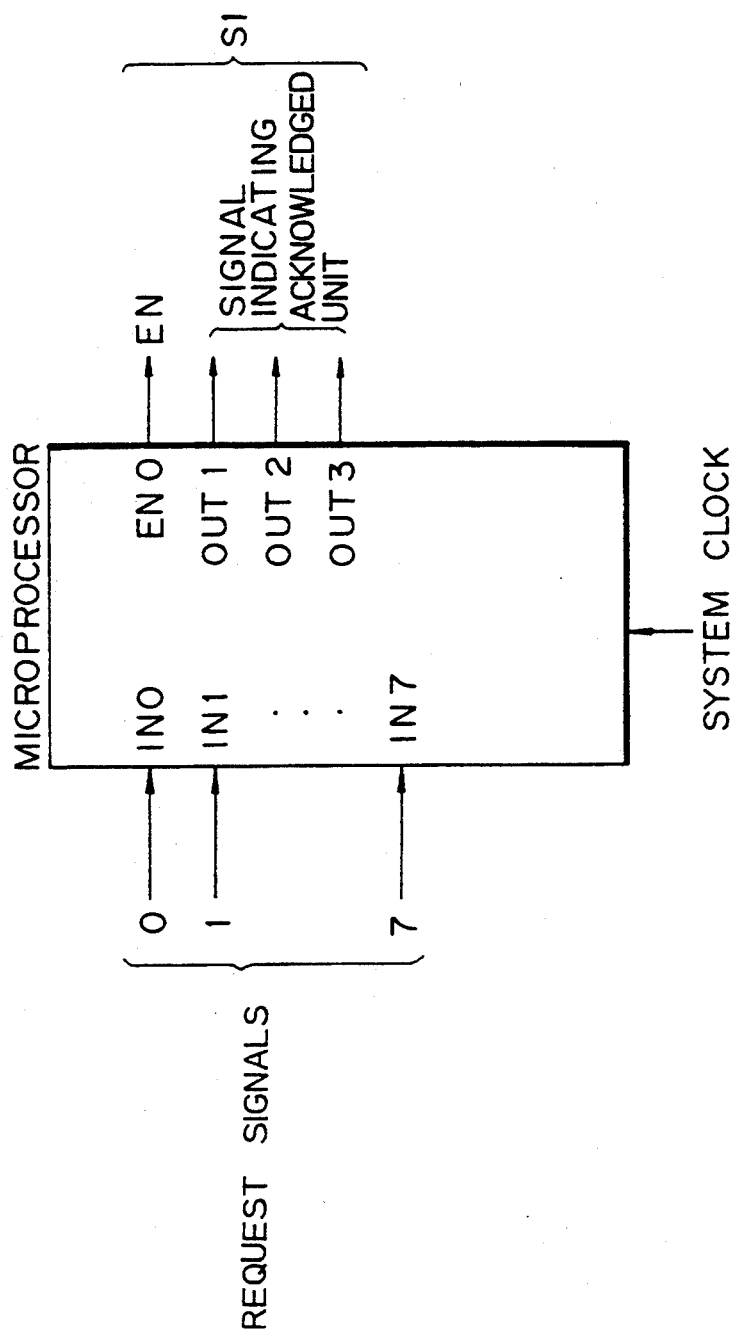
FIG. 8 is a diagram illustrating inputs and outputs of a microprocessor used for the priority control circuit 71.

(4) Priority Control Circuit (FIGS. 6, 7, and 8)

The priority control circuit 71 can be realized by one or a combination of a plurality of priority encoder devices. The priority encoder device, which is commercially available as an integrated circuit (IC) chip, inputs a plurality of input terminals ordered in a predetermined priority order, and outputs an encoded signal indicating one input terminal having the highest priority order among at least one input terminal to which an active signal is input. FIG. 6 is a diagram illustrating inputs and outputs of the priority encoder device used for the priority control circuit 71. In FIG. 6, a plurality of request signals, including the data transfer request signals from the bus slave units, the CPU 1, and a DRAM refresh request signal (as one of the bus request signals from the above other requesting sources), are respectively input into the plurality of input terminals I0, I1, . . . I7 of the priority encoder device, where the priority order of the inputs is I0>I1> . . . >I7. The three-bit output (OUT1, OUT2, OUT3) of the priority encoder device indicates the above acknowledged requesting source, and the output bit EN becomes active when at least one of the bus requesting signals input thereto is active. In some commercially available priority encoders, the priority order can be changed by a presetting operation.

FIG. 7 is a diagram illustrating the construction of a priority control circuit constructed by a plurality of priority encoder devices. In the construction of FIG. 7, a plurality of priority encoder devices 701 to 70$m$ are provided in a first stage, and a priority encoder device 710 is provided in a second stage. The plurality of request signals are input into the input terminals of the plurality of priority encoder devices 701 to 70$m$ in the first stage, and the EN outputs of the plurality of priority encoder devices 701 to 70$m$ in the first stage are applied to the plurality of input terminals of the priority encoder device in the second stage. All the output bits OUT1 of the plurality of priority encoder devices 701 to 70$m$ in the first stage are OR connected to obtain an output bit OUT4', all the output bits OUT2 of the plurality of priority encoder devices 701 to 70$m$ in the first stage are OR connected to obtain an output bit OUT5', and all the output bits OUT3 of the plurality of priority encoder devices 701 to 70$m$ in the first stage are OR connected to obtain an output bit OUT6'. Thus, the six-bit output comprised of the three output bits OUT1', OUT2', and OUT3' of the priority encoder device 710 in the second stage, and the above three bits OUT4', OUT5', and OUT6', indicates the above acknowledged requesting source. The output bit EN of the priority encoder device 710 in the second stage becomes active when at least one of the bus requesting signals input thereto is active.

FIG. 8 is a diagram illustrating inputs and outputs of a microprocessor used for the priority control circuit 71. In FIG. 8, the inputs and the outputs of the microprocessor are the same as the priority encoder device of FIG. 6. However, the microprocessor sequentially determines whether or not an active request signal of each priority level is received from one of the plurality of requesting sources by executing a program which is stored in a ROM (not shown) for the priority control, and determines one of the plurality of requesting sources which sends a request signal of the highest priority, as the acknowledged requesting source. In this case, the microprocessor operates synchronized with a clock signal of a frequency larger than the frequency of the bus cycle.

In addition, generally, the bus cycle may be equal to or an integer multiple of a cycle time of the system clock of the image processing apparatus.

Figure 9:
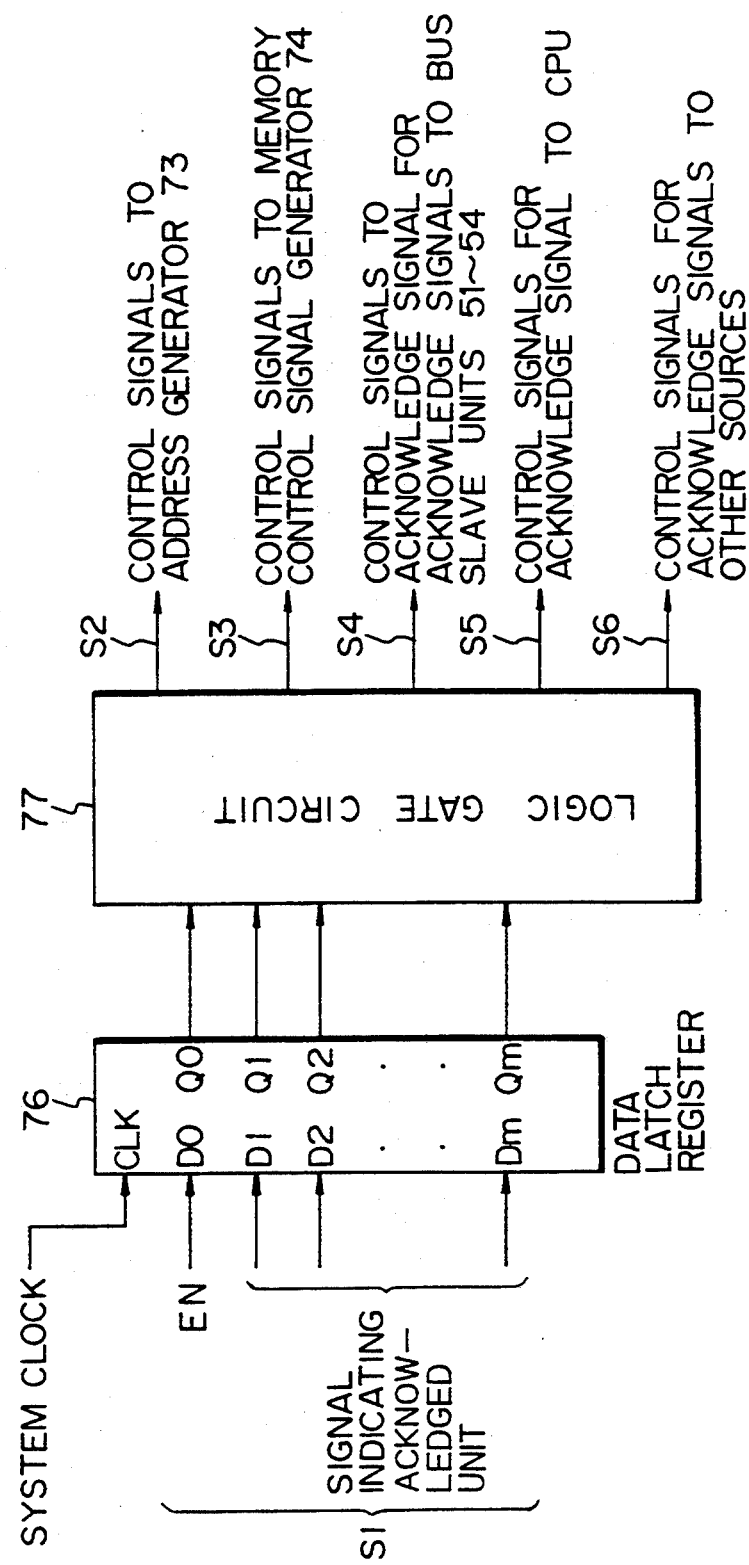
FIG. 9 is a diagram illustrating the construction of a controller 72 containing a data latch circuit.

(5) Controller 72 (FIG. 9)

FIG. 9 is a diagram illustrating the construction of a controller 72 containing a data latch circuit. In the construction of FIG. 9, reference numeral 76 denotes a data latch register, and 77 denotes a logic gate circuit. In the data latch circuit 76, the output of the priority control circuit 71 at each bus cycle is latched for one bus cycle. The logic gate circuit 77 receives the output of the data latch circuit 76, and outputs control signals for controlling the address generator 73, the memory control signal generator 74, and the acknowledge signal generator 75, based on the outputs of the data latch circuit 76. Thus, the operations of the logic gate circuit 77, the address generator 73, the memory control signal generator 74, and the acknowledge signal generator 75, are carried out one bus cycle after the operation of the priority control circuit 71, and therefore, the operations of generating the address signals, the control signals, and the acknowledge signals, are not delayed by the time needed to determine the acknowledged requesting source. Namely, the bus arbitration operations and the DMA data transfer operations are concurrently carried out.

(6) Logic Gate Circuit (Table 1)

Table 1 indicates the relationship between the inputs and the outputs of the logic gate circuit 77. When no active request signal is sent to the common-bus control unit 7', the inputs and the outputs of the logic gate circuit 77 are as indicated in item 1 of Table 1.

The items 2 to 6 in Table 1 indicate the inputs and the outputs of the logic gate circuit 77 when the bus slave units (the read-in image input unit 51, the image output unit 52, the compression/expansion unit 53, and the communication control unit 54) in the facsimile terminal apparatus send an active data transfer request signal to the common-bus control unit 7', and the values of the output OUT1, OUT2, and OUT3 indicate one of the bus slave units which is acknowledged. In this case, the acknowledge signal generator 75 generates and sends to one of the bus slave units which is acknowledged for transferring image data through the common bus 40, an acknowledge signal; the memory control signal generator 74 generates and outputs to the memory 6 the chip select signal (CS), the read/write signal (R/W), the row address signal (RAS), and the column address signal (CAS); and the address generator 73 generates and outputs to the memory 6 address signals; respectively. In Table 1, "ON" in the column of the control signal (S2) means that the control signal (S2) makes the address generator 73 output an address signal for the current bus cycle and obtain an address signal by calculation for the next bus cycle. Thus, a DMA data transfer operation is realized between the memory 6 and the bus slave unit which is acknowledged for the DMA data transfer operation through the common bus 40.

When an active bus request signal is sent from the CPU 1 to the common-bus control unit 7', the inputs and the outputs of the logic gate circuit 77 are as indicated in item 7 of Table 1. When an active bus request signal is sent to the common-bus control unit 7' from one of the above-mentioned other requesting sources, the inputs and the outputs of the logic gate circuit 77 are as indicated in item 8 of Table 1. In this case, a grant for use for the common bus 40 is imparted to the requesting source which is located outside of the facsimile terminal apparatus, and is connected to the common bus 40 of the facsimile terminal apparatus.

When the DRAM refresh request signal is applied as an active bus request signal to the common-bus control unit 7' from one of the above-mentioned other requesting sources, the inputs and the outputs of the logic gate circuit 77 are as indicated in item 9 of Table 1. In this case, the control signal S3 output from the logic gate circuit 77 to the memory control signal generator 74, makes the memory control signal generator 74 generate control signals for operating the DRAM(s) constituting the memory 6 in the CAS before RAS mode to perform the refreshing operation of the DRAM. The above DRAM refresh request signal is generated in a refresh timing generator (not shown) which is provided in the facsimile terminal apparatus, and is realized by a counter dividing the frequency of the clock signal, to generate an active signal as the DRAM refresh request signal, with a predetermined frequency. This refreshing operation is required only when the memory 6 is realized by a DRAM. The memory 6 may be realized by a static RAM (SRAM), a flash access memory, or a dual port memory. When the data widths (word lengths) of the two ports of the dual port memory are different, the address generator 73 generates addresses for the respective data widths (word lengths).

The above common-bus control unit 7' may be constructed on a single LSI (Large Scale Integrated Circuit) chip formed on a semi-conductor substrate, and further the construction of FIG. 4 except the CPU 1, the memory 6', the MODEM, the ROM 11, and the RAM 12 may be constructed on a single LSI chip.

Figure 10B:
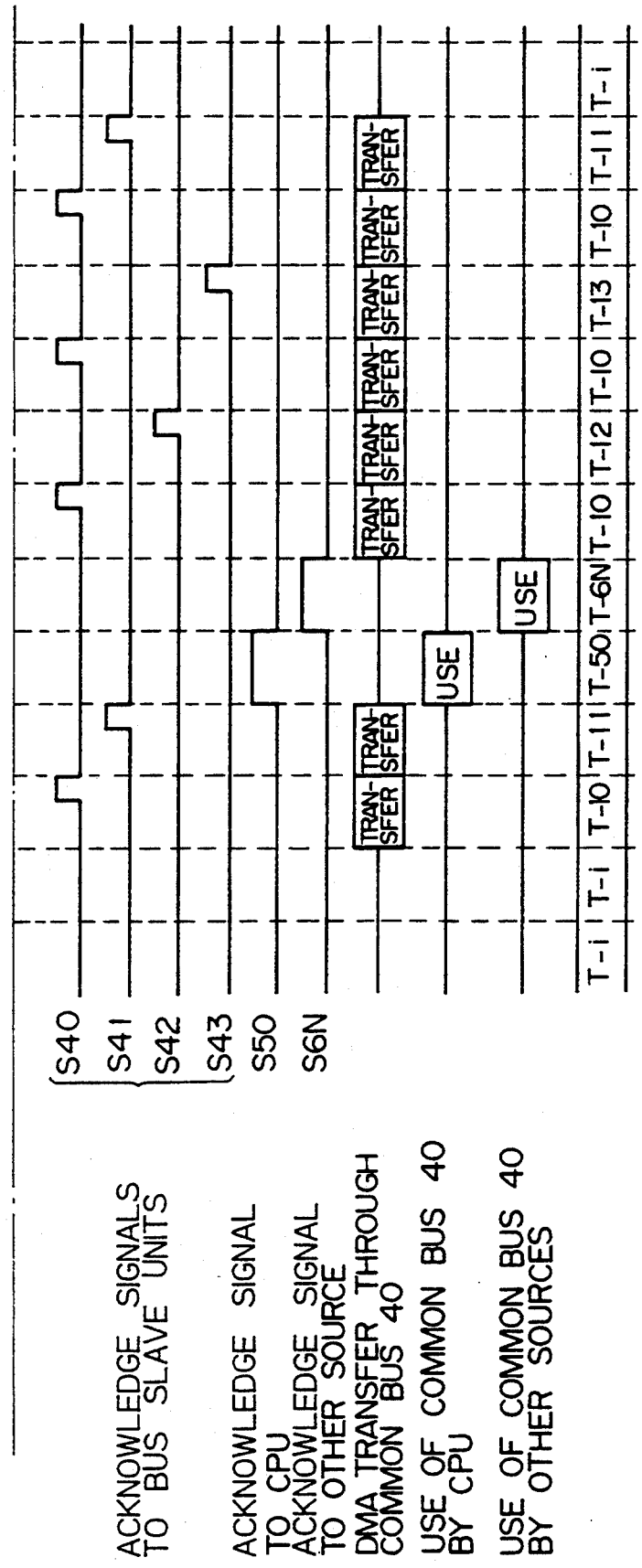

(7) Timing Diagram of Control of Common Bus (FIGS. 10A and 10B)

FIGS. 10A and 10B indicate a timing diagram of the control of the common bus 40. In FIGS. 10A and 10B, TA0, TA1, TA2, . . . TA12 each denote a bus cycle, S10 to S13 denote data transfer request signals for requesting to transfer data through the common bus 40 between the memory 6 and the bus slave units (the read-in image input unit 51, the image output unit 52, the compression/expansion unit 53, and the communication control unit 54) respectively; S20 denotes a bus request signal from the CPU 1 for requesting a grant for use of the common bus 40; S3N denotes a bus request signal for requesting a grant for use of the common bus 40 for a purpose other than the transfer of data between the memory 6 and one of the bus slave units; S40 to S43 denote acknowledge signals corresponding to the data transfer request signals S10 to S1N, respectively; S50 denotes an acknowledge signal corresponding to the bus request signal S20; S6N denotes an acknowledge signal corresponding to the bus request signal S3N; DMA0 to DMA3 indicate that the DMA data transfer through the common bus 40 requested by the data transfer request signals S10 to S13, are acknowledged, respectively; CPU denotes that the use of the common bus 40 requested by the CPU 1 is acknowledged; T-i denotes a state that the common bus 40 is not used; T-10 to T-13 denote states that the common bus 40 is used for data transfer operations between the memory 6 and the bus slave units which send the data transfer request signal S10 to S13, respectively; S50 denotes a state that the common bus 40 is used by the CPU 1; and T-6N denotes a state in which the common bus 40 is used by the requesting source which sends the bus request signal S3N.

As indicated in FIGS. 10A and 10B, the determination of the acknowledged requesting source is performed within the same bus cycle in which the requesting source sends the request signal, and, in the next bus cycle, the acknowledge signal is sent to the acknowledged requesting source. Then, the data transfer is performed through the common bus 40 between the memory 6 and the acknowledged requesting source when the acknowledged requesting source is one of the bus slave units, or the common bus 40 is used by the requesting source which sends the bus request signal S20 or S3N when the acknowledged requesting source is the CPU 1 or the other requesting source.

Figure 11:
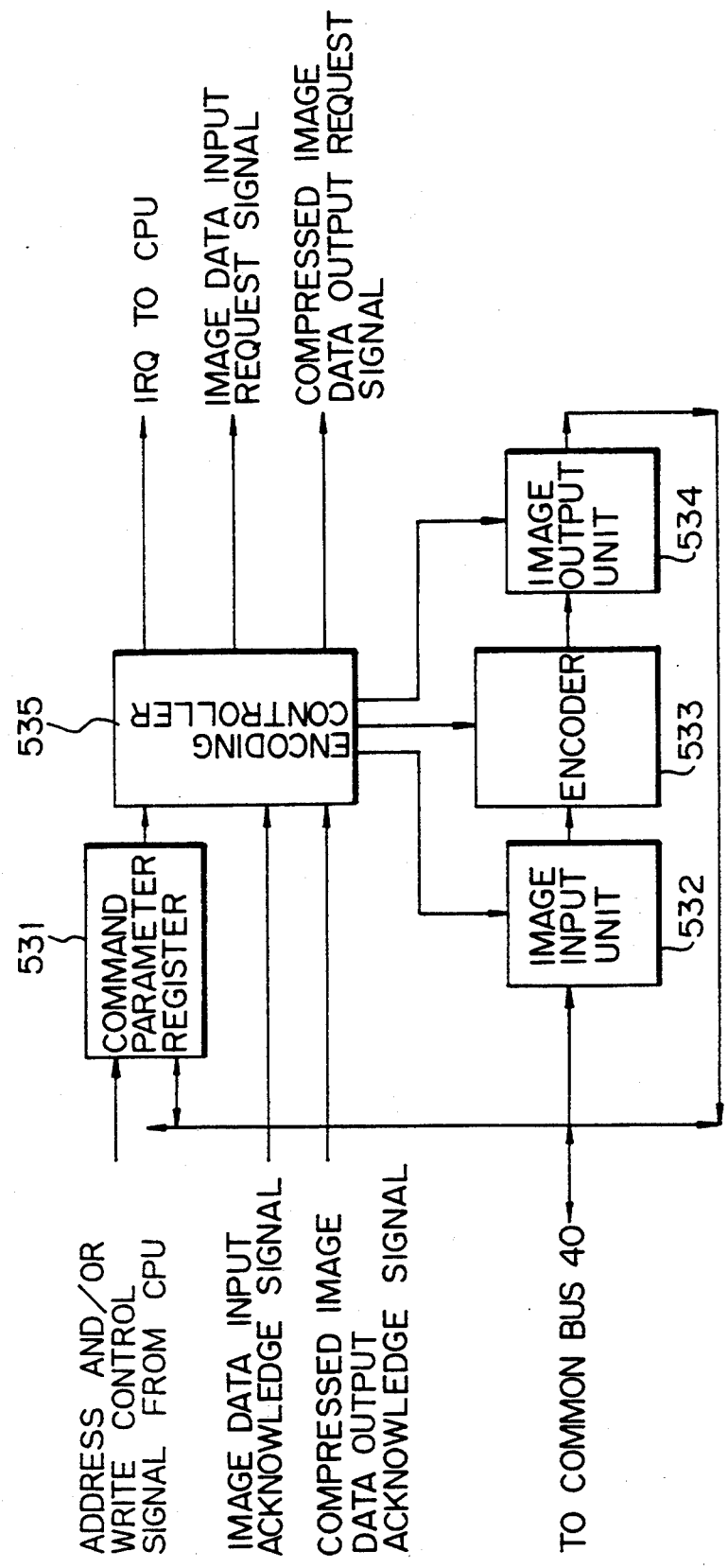
FIG. 11 is a diagram illustrating the construction of an encoder portion of the compression/expansion unit 53.

(8) Compression/Expansion Unit 53 (FIGS. 11)

FIG. 11 is a diagram illustrating the construction of an encoder portion of the compression/expansion unit 53 constructed by a plurality of priority encoder devices. In the construction of FIG. 11, reference numeral 531 denotes a command register, 532 denotes an image input unit, 533 denotes an encoder, 534 denotes a code output unit, and 535 denotes an encoding controller. The command register 531 is connected to the address bus 41, the control signal bus 42, and the data bus 43. The aforementioned compression command is applied to the command register 531 through thre data bus 43. A write control signal is supplied to the command register 531 through the control signal bus 42 to control an operation of writing the compression command in the command register 531. When a plurality of registers are provided in the command register 531, an address signal may be supplied to the command register 531 through the address bus 41 to write the compression command in one of the plurality of registers in the command register 531. The encoding controller 535 controls the operations of the compression/expansion unit 53 as explained before with reference to FIG. 1. The encoding controller 535 receives the aforementioned image data input acknowledge signal and the compressed image data transfer acknowledge signal, and outputs the aforementioned image data input request signal and the compressed image data output request signal, respectively, at the timings explained before with reference to FIG. 1. The image data to be compressed (encoded) is input through the common bus 40 into the image input unit 532 which contains the aforementioned first buffer register therein, before being encoded in the encoder 533. The image data encoded in the encoder 533 is once held in the aforementioned second buffer register provided in the code output unit 534, and is then output therefrom through the common bus 40.

Although not shown, the compression/expansion unit 53 also contains a decoder portion for expanding compressed image data. The decoder portion of the compression/expansion unit 53 can be constructed by replacing the image input unit 532 in the encoder portion with a unit which has the same construction as the image output unit 534 in the encoder portion, the image output unit 534 in the encoder portion with a unit which has the same construction as the image input unit 532 in the encoder portion, and the encoder 533 in the encoder portion with a decoder.

(9) Operations of Bus Slave Unit

The operations of the read-in image input unit 51, the image output unit 52, the compression/expansion unit 53, and the communication control unit 54 when receiving, compressing, and transmitting image data, are the same as in the conventional construction of FIG. 1, except that the data transfer request signals are sent to the common-bus control unit 7' instead of the DMA controller 8, that the acknowledge signals are sent from the common-bus control unit 7' instead of the DMA controller 8, that the data transfer acknowledge signals are sent to the bus slave units faster than the conventional construction of FIG. 1, and that the DMA transfer is controlled by the common-bus control unit 7' instead of the DMA controller 8, according to the present invention. Therefore, the explanation is not repeated here.

The operations of the read-in image input unit 51, the image output unit 52, the compression/expansion unit 53, and the communication control unit 54 when receiving, compressing, and transmitting image data, are as follows.

When receiving a transmission frame containing compressed image data through the MODEM 55, the received image data is once held in a buffer register (not shown) in the communication control unit 54. When the amount of the image data held in the buffer register reaches a predetermined amount, the communication control unit 54 sends an active data transfer request signal to the common-bus control unit 7' for requesting to transmit or receive image data through the common bus 40. When the request is acknowledged, the common-bus control unit 7' sends an acknowledge signal to the communication control unit 54, and the received image data is transferred by the DMA mode to a received data storing area in the memory 6. The CPU 1' monitors an amount of image data stored in the received data storing area in the memory 6. When the CPU 1' detects a state of the memory 6 in which the amount of image data stored in the received data storing area reaches a predetermined amount, the CPU 1' sends an expansion command to the compression/expansion unit 53. Receiving the expansion command, the compression/expansion unit 53 sends an active data transfer request signal (compressed data input request signal) to the common-bus control unit 7' for requesting to transfer the received image data stored in the read-in data storing area in the memory 6 through the common bus 40, to the compression/expansion unit 53. When the request is acknowledged through the arbitration as above, the common-bus control unit 7' sends an active acknowledge signal (compressed data input acknowledge signal) corresponding to the compressed data input request signal, to the compression/expansion unit 53, and the image data stored in the received data storing area in the memory 6, is transferred to the compression/expansion unit 53 through the bus 20 by the DMA mode under control of the common-bus control unit 7'. The compression/expansion unit 53 receives and expands (decodes) the transferred image data. The expanded image data is once held in a buffer register (not shown) in the compression/expansion unit 53. When the amount of the expanded image data in the buffer register reaches a predetermined amount, the compression/expansion unit 53 sends an active data transfer request signal (expanded image data output request signal) to the common-bus control unit 7' for requesting to transmit or receive image data through the bus 20 to transfer the image data expanded and held in the buffer register in the compression/expansion unit 53, to an output image data storing area in the memory 6. When the request is acknowledged through the arbitration, the common-bus control unit 7' sends an active acknowledge signal (expanded image data output acknowledge signal) to the compression/expansion unit 53, and the image data held in the buffer register in the compression/expansion unit 53, is transferred, as output image data, to the output image data storing area in the memory 6. In addition, every time the transfer operation of the expanded image data corresponding to one sheet, to the output image data storing area in the memory 6, is completed, the compression/expansion unit 53 sends an interrupt signal to the CPU 1' to inform of the completion of the transfer of the expanded image data of one sheet. Receiving the interrupt signal, the CPU 1' sends an image output command to the image output unit 52. Receiving the image output command, the image output unit 52 sends an active data transfer request signal to the common-bus control unit 7' for requesting to transmit or receive image data through the bus 20 to transfer the image data stored in the output image data storing area in the memory 6, to the image output unit 51. When the request is acknowledged through the arbitration, the common-bus control unit 7' sends an active acknowledge signal to the image output unit 51, and the image data stored in the output image data storing area in the memory 6 is transferred by the DMA mode to the image output unit 52. Then, the image data is supplied to the printer to print the image data on paper.

In addition, when transmitting image data, it is necessary to obtain information on capability of a facsimile terminal apparatus to which the image data is to be transmitted. When the communication control unit 54 receives the information through the MODEM 55, the communication control unit 54 sends a data transfer request signal to the common-bus control unit 7' for requesting to transfer the image data through the common bus 40. When the request is acknowledged, the communication control unit 54 receives an acknowledge signal in response to the data transfer request signal, and the DMA transfer of the information from the communication control unit 54 to the memory 6 is performed. Then, the CPU 1 reads the information in the memory 6.

Figure 12B:
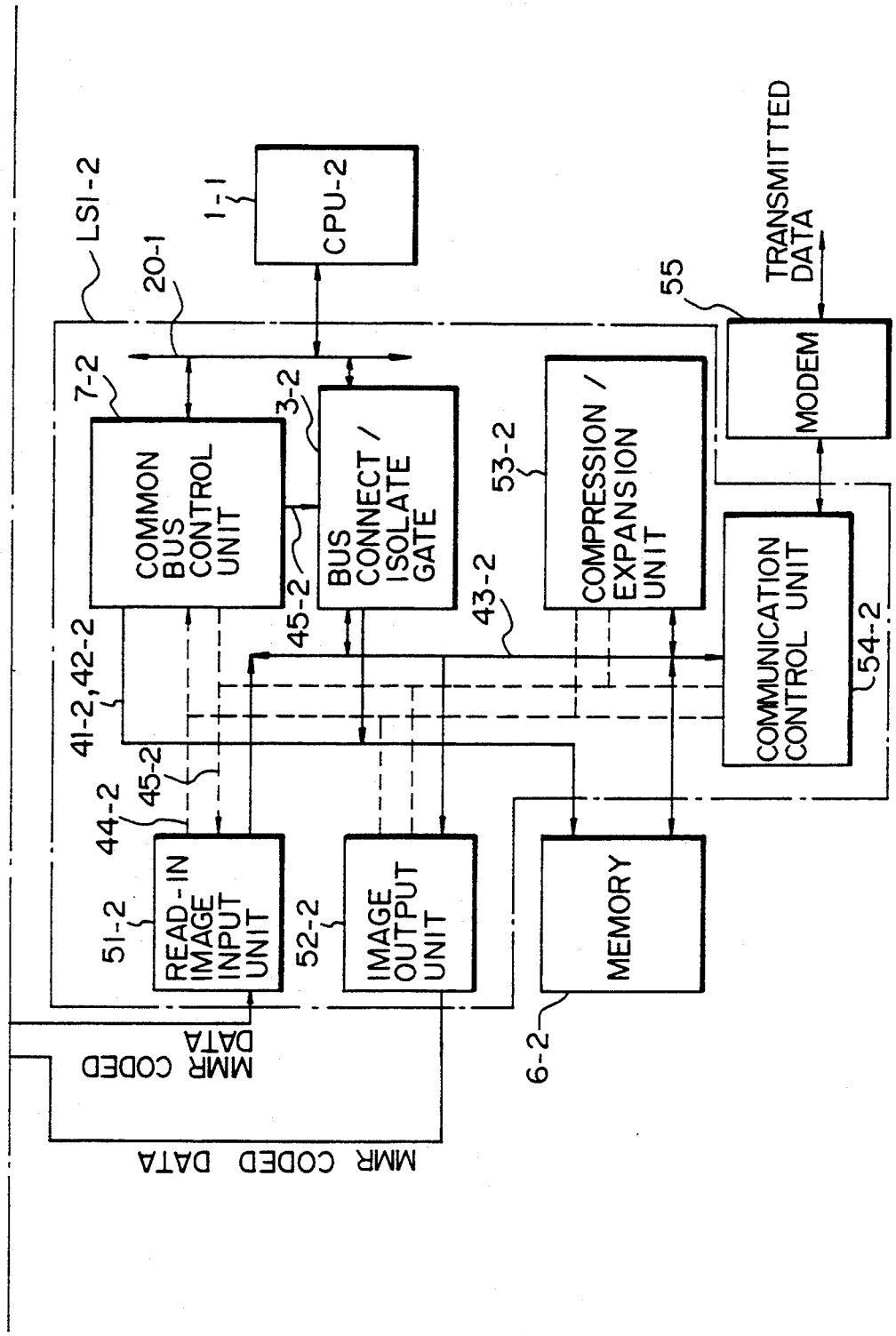

(10) Second Embodiment (FIGS. 12A and 12B)

FIGS. 12A and 12B are a diagram illustrating the construction of the second embodiment of the present invention. In FIGS. 12A and 12B, LSI-1 and LSI-2 each denote the aforementioned LSI chip containing the construction of FIG. 4 except the CPU 1, the memory 6, the MODEM, the ROM 11, and the RAM 12. In the construction of FIGS. 12A and 12B: the CPU 1-1, a ROM, and a RAM (although the ROM and the RAM are not shown) are connected with the CPU bus 20-1 in the LSI chip LSI-1; the CPU 1-2, a ROM, and a RAM (although the ROM and the RAM are not shown) are connected with the CPU bus 20-2 in the LSI chip LSI-2; the memory 6-1 is connected with the common bus 40-1 in the LSI chip LSI-1; the memory 6-2 is connected with the common bus 40-2 in the LSI chip LSI-2; the MODEM 55 is connected with the communication control unit 54-2 in the LSI chip LSI-2; an input terminal on the transmission line side of the communication control unit 54-1 in the LSI chip LSI-1 is connected with an output terminal of the image output unit 52-2 in the LSI chip LSI-2; an output terminal on the transmission line side of the communication control unit 54-1 in the LSI chip LSI-1 is connected with an input terminal of the image input unit 51-2 in the LSI chip LSI-2; an input terminal of the image input unit 51-1 in the LSI chip LSI-1 is connected to a scanner (not shown); and an output terminal of the image output unit 52-2 in the LSI chip LSI-1 is connected with a printer (not shown).

The LSI chip LSI-1 is provided for processing image data which is read through the scanner, and image data which is to be printed by the printer; and the LSI chip LSI-2 is provided for processing image data which is received through the MODEM 55, and image data which is to be transmitted through the MODEM 55.

In the construction of FIGS. 12A and 12B, an image on paper is read by the scanner to generate image data, and the image data is input into the read-in image input unit 51-1 in the LSI chip LSI-1, is then transferred to and temporarily stored in the memory 6-1. The image data is encoded in the compression/expansion unit 53-1 to MMR codes, and is then transferred to and temporarily stored in the memory 6-1. Next, the MMR coded image data is transferred from the memory 6-1 in the LSI chip LSI-1 to the memory 6-2 in the LSI chip LSI-2 through the communication control unit 54-1 in the LSI chip LSI-1 and the read-in image input unit 51-2 in the LSI chip LSI-2. The MMR coded image data stored in the memory 6-2 is transferred to the compression/expansion unit 53-2 to decode the MMR coded image data, and then the decoded image data is transferred to the memory 6-2. Next, the decoded image data stored in the memory 6-2 is transferred again to the compression/expansion unit 53-2 to encode the image data to MH codes. The MH coded image data is transferred again to the memory 6-2, and is then transferred to the communication control unit 54-2 to transmit the MH coded image data through the MODEM 55. The code used to compress the image data in the LSI chip LSI-2 may be changed in accordance with a coding/decoding mode in the facsimile terminal apparatus with which the facsimile terminal apparatus of FIGS. 12A and 12B communicates. The image data is encoded to the MMR codes in the LSI chip LSI-1 because a high compression ratio is obtained by the MMR coding, while the MH coding is widely used in the facsimile terminal apparatuses at present.

In the above operations, data transfer operations are carried out as explained in the first embodiment. In the construction of FIGS. 12A and 12B, the reading or printing operation using the LSI chip LSI-1 and the receiving or transmitting operation using the LSI chip LSI-2 can be concurrently carried out.

Further, although not shown, a plurality of LSI chips to each of which a CPU, a memory, and a MODEM is connected, may be connected to the communication control unit 54-1 in the LSI chip LSI-1 indicated in FIGS. 12A and 12B. According to this construction, a facsimile message can be concurrently transmitted to or received from a plurality of destinations, in addition to the concurrent reading or printing operation.

TABLE 1

Relationship between Inputs and Outputs of the Logic Gate Circuit 77

| | Input (S1) | | Outputs (S2 to S6) | | | | |
|---|---|---|---|---|---|---|---|
| Item | OUT1 to OUT3 | EN | Control Signal (S3) | Control Signal (S2) | Control Signal (S4) | Control Signal (S5) | Control Signal (S6) |
| 1 | X | 0 | OFF | OFF | OFF | OFF | OFF |
| 2 | 0 | 1 | CS, R/W, RAS, CAS: ON | ON | ACK0 ON | OFF | OFF |
| 3 | 1 | 1 | CS, R/W, RAS, CAS: ON | ON | ACK1 ON | OFF | OFF |
| 4 | 2 | 1 | CS, R/W, RAS, CAS: ON | ON | ACK2 ON | OFF | OFF |
| 5 | 3 | 1 | CS, R/W, RAS, CAS: ON | ON | ACK3 ON | OFF | OFF |
| 6 | 4 | 1 | CS, R/W, RAS, CAS: ON | ON | ACK4 ON | OFF | OFF |
| 7 | 5 | 1 | OFF | OFF | OFF | ON | OFF |
| 8 | 6 | 1 | OFF | OFF | OFF | OFF | ON |

TABLE 1-continued

Relationship between Inputs and Outputs of the Logic Gate Circuit 77

| Item | Input (S1) OUT1 to OUT3 | EN | Outputs (S2 to S6) Control Signal (S3) | Control Signal (S2) | Control Signal (S4) | Control Signal (S5) | Control Signal (S6) |
|---|---|---|---|---|---|---|---|
| 9 | 7 | 1 | Output CAS before RAS | OFF | OFF | OFF | ON |

We claim:

1. A processing apparatus comprising:
a first bus;
a second bus;
a central processing unit connected to the first bus;
a plurality of bus slave units respectively connected to the second bus;
memory means, connected to the second bus, for storing data;
second-bus control means connected with each of the plurality of bus slave units and the central processing unit; and
bus connect/isolate gate means connected with the first and second buses and the second-bus control means,
said central processing unit comprising a bus request signal sending means for sending a bus request signal to the second-bus control means when the central processing unit has a demand to use the second bus,
each of the plurality of bus slave units comprising a data transfer request signal sending means for sending a data transfer request signal to the second-bus control means when each of the plurality of bus slave units has a demand to transmit or receive data through the second bus,
said bus connect/isolate gate means being able to isolate the first bus from the second bus, or to connect the first bus with the second bus, under control of the second-bus control means,
said second-bus control means comprising:
request signal receiving means for receiving the bus request signal from the central processing unit and the data transfer request signals from the plurality of bus slave units;
acknowledged unit determining means for determining one of the central processing unit which sends the bus request signal and the plurality of bus slave units which send the data transfer request signals, as an acknowledged unit;
acknowledge signal sending means for sending an acknowledge signal to said acknowledged unit;
gate control means for making the bus connect/isolate gate connect the first bus with the second bus when the central processing unit is the acknowledged unit, and making the bus connect/isolate gate isolate the first bus from the second bus when the central processing unit is not the acknowledged unit; and
DMA control means, connected to the second bus, for controlling the memory means so that data transfer between the memory means and said acknowledged unit is performed through said second bus by a direct memory access operation when said acknowledged unit determining means determines one of the bus slave units as the acknowledged unit.

2. A processing apparatus comprising:
a first bus;
a second bus;
a central processing unit connected to the first bus;
a plurality of bus slave units respectively connected to the second bus;
memory means, connected to the second bus, for storing data;
second-bus control means connected with each of the plurality of bus slave units and the central processing unit; and
bus connect/isolate gate means connected with the first and second buses and the second-bus control means,
said central processing unit comprising a bus request signal sending means for sending a bus request signal to the second-bus control means when the central processing unit has a demand to use the second bus,
each of the plurality of bus slave units comprising a data transfer request signal sending means for sending a data transfer request signal to the second-bus control means when each of the plurality of bus slave units has a demand to transmit or receive data through the second bus,
said bus connect/isolate gate means being able to isolate the first bus from the second bus, or to connect the first bus with the second bus, under control of the second-bus control means,
said second-bus control means comprising:
request signal receiving means for receiving the bus request signal from the central processing unit and the data transfer request signals from the plurality of bus slave units;
acknowledged unit determining means for determining one of the central processing unit which sends the bus request signal and the plurality of bus slave units which send the data transfer request signals, as an acknowledged unit;
acknowledge signal sending means for sending an acknowledge signal to said acknowledged unit;
gate control means for making the bus connect/isolate gate connect the first bus with the second bus when the central processing unit is the acknowledged unit, and making the bus connect/isolate gate isolate the first bus from the second bus when the central processing unit is not the acknowledged unit; and
DMA control means, connected to the second bus, for controlling the memory means so that data transfer between the memory means and said acknowledged unit is performed through said second bus by a direct memory access operation when said acknowledged unit determining means determines one of the bus slave units as the acknowledged unit, wherein:
the operation of said acknowledged unit determining means is performed periodically; and
said processing apparatus further comprises latch means for latching information on the acknowledged unit determined by the acknowledged unit determining means, for each period of the operation of said acknowledged unit determining means, and supplying the latched information to said DMA control means, said acknowledge signal sending means, and said gate control means.

3. A processing apparatus comprising:

a first bus;

a second bus;

a central processing unit connected to the first bus;

a plurality of bus slave units respectively connected to the second bus;

memory means, connected to the second bus, for storing data;

second-bus control means connected with each of the plurality of bus slave units and the central processing unit; and bus connect/isolate gate means connected with the first and second buses and the second-bus control means, said central processing unit comprising a bus request signal sending means for sending a bus request signal to the second-bus control means when the central processing unit has a demand to use the second bus, each of the plurality of bus slave units comprising a data transfer request signal sending means for sending a data transfer request signal to the second-bus control means when each of the plurality of bus slave units has a demand to transmit or receive data through the second bus, said bus connect/isolate gate means being able to isolate the first bus from the second bus, or to connect the first bus with the second bus, under control of the second-bus control means, said second-bus control means comprising:

request signal receiving means for receiving the bus request signal from the central processing unit and the data transfer request signals from the plurality of bus slave units;

acknowledged unit determining means for determining one of the central processing unit which sends the bus request signal and the plurality of bus slave units which send the data transfer request signals, as an acknowledged unit;

acknowledge signal sending means for sending an acknowledge signal to said acknowledged unit;

gate control means for making the bus connect/isolate gate connect the first bus with the second bus when the central processing unit is the acknowledged unit, and making the bus connect/isolate gate isolate the first bus from the second bus when the central processing unit is not the acknowledged unit; and DMA control means, connected to the second bus, for controlling the memory means so that data transfer between the memory means and said acknowledged unit is performed through said second bus by a direct memory access operation when said acknowledged unit determining means determines one of the bus slave units as the acknowledged unit, wherein said DMA control means comprises:

address generating means for generating an address signal to be supplied to the memory means for controlling the memory means in the data transfer operation, and control signal generating means for generating control signals to be supplied to the memory means for controlling the memory means in the data transfer operation.

4. A facsimile terminal apparatus comprising, a first bus, a second bus, a central processing unit connected to the first bus, a plurality of bus slave units respectively connected to the second bus, memory means, connected to the second bus, for storing data, second-bus control means connected with each of the plurality of bus slave units and the central processing unit, and bus connect/isolate gate means connected with the first and second buses and the second-bus control means, said central processing unit comprising a bus request signal sending means for sending a bus request signal to the second-bus control means when the central processing unit has a demand to use the second bus;

each of the plurality of bus slave units comprising a data transfer request signal sending means for sending a data transfer request signal to the second-bus control means when each of the plurality of bus slave units has a demand to transmit or receive data through the second bus;

said bus connect/isolate gate means being able to isolate the first bus from the second bus, or to connect the first bus with the second bus, under control of the second-bus control means;

said second-bus control means comprising, request signal receiving means for receiving the bus request signal from the central processing unit and the data transfer request signals from the plurality of bus slave units;

acknowledged unit determining means for determining one of the central processing unit which sends the bus request signal and the plurality of bus slave units which sends the data transfer request signal, as an acknowledged unit;

acknowledge signal sending means for sending an acknowledge signal to said acknowledged unit;

gate control means for making the bus connect/isolate gate connect the first bus with the second bus when the central processing unit is the acknowledged unit, and making the bus connect/isolate gate isolate the first bus from the second bus when the central processing unit is not the acknowledged unit;

said facsimile terminal apparatus further comprising a DMA control means for controlling the memory means so that data transfer between the memory means and said acknowledged unit is performed through said second bus by a direct memory access operation when said acknowledged unit determining means determines one of the bus slave units as the acknowledged unit;

said plurality of bus slave units including a read-in image input unit, an image output unit, a compression unit, an expansion unit, and a communication control unit;

said data transfer request signal sending means in said compression unit comprises first data transfer request signal sending means for sending a first data transfer request signal to the second-bus control means, and a second data transfer request signal sending means for sending a second data transfer request signal to the second-bus control means, said data transfer request signal sending means in said communication control unit comprises third data transfer request signal sending means for sending a third data transfer request signal to the second-bus control means, and a fourth data transfer request signal sending means for sending a fourth data transfer request signal to the second-bus control means, said data transfer request signal sending means in said expansion unit comprises fifth data transfer request signal sending means for sending a fifth data transfer request signal to the second-bus control means, and a sixth data transfer request signal sending means for sending a sixth data transfer request signal to the second-bus control means;

said read-in image input unit comprising,
first and second data ports,
means for inputting image data through the first data port,
first register means for temporarily holding the image data,
first detecting means for detecting a first state of the first register means, in which the first register means holds the image data,
means for receiving the acknowledge signal from said second-bus control means in response to said data transfer request signal sent from the data transfer request signal sending means in the read-in image input unit, and
means for transferring the image data to the memory means through said second data port and said second bus to which the second port is connected, to store the image data in the memory means as a first image data, when receiving said acknowledge signal by said acknowledge signal receiving means in the read-in image input unit,
said data transfer request signal sending means in said read-in image input unit sends the data transfer request signal to the second-bus control means, when said first detecting means detects said first state;

said compression unit comprising,
means for receiving a compression command from the central processing unit,
first acknowledge signal receiving means for receiving a first acknowledge signal from said second-bus control means in response to said first data transfer request signal sent from the first data transfer request signal sending means,
means for receiving the first image data transferred from the memory means through said second bus, when receiving said first acknowledge signal,
means for compressing said first image data,
second register means for temporarily holding the compressed first image data,
second detecting means for detecting a second state of the second register means, in which the second register means holds the compressed first image data,
second acknowledge signal receiving means for receiving a second acknowledge signal from said second-bus control means in response to said second data transfer request signal sent from the second data transfer request signal sending means, and
means for transferring the compressed first image data to the memory means through said second bus, to store the compressed first image data in the memory means, when receiving said second acknowledge signal,
said first data transfer request signal sending means in said compression unit sends the first data transfer request signal to the second-bus control means, when receiving said compression command, and
said second data transfer request signal sending means in said compression unit sends the second data transfer request signal to the second-bus control means, when said second detecting means detects said second state;

said communication control unit comprising,
third and fourth data ports,
transmission command receiving means for receiving a transmission command from the central processing unit,
third acknowledge signal receiving means for receiving a third acknowledge signal from said second-bus control means in response to said third data transfer request signal sent from the third data transfer request signal sending means,
means for receiving the compressed first image data transferred from the memory means through said third data port and said second bus to which the third data port is connected, when receiving said third acknowledge signal in response to said third data transfer request signal,
means for transmitting said compressed first image data through the fourth data port,
means for receiving said a compressed second image data through the fourth data port,
third register means for temporarily holding the compressed second image data,
third detecting means for detecting a third state of the third register means, in which the third register means holds the compressed second image data,
fourth acknowledge signal receiving means for receiving a fourth acknowledge signal from said second-bus control means in response to said fourth data transfer request signal sent from the fourth data transfer request signal sending means, and
means for transferring the compressed second image data to the memory means through said second bus to store the compressed second image data in the memory means, when receiving said fourth acknowledge signal,
said third data transfer request signal sending means in said communication control unit sends the third data transfer request signal to the second-bus control means, when receiving said transmission command, and
said fourth data transfer request signal sending means in said communication control unit sends the fourth data transfer request signal to the second-bus control means, when said third detecting means detects said third state;

said expansion unit comprising, means for receiving an expansion command from the central processing unit, fifth acknowledge signal receiving means for receiving a fifth acknowledge signal from said second-bus control means in response to said fifth data transfer request signal sent from the fifth data transfer request signal sending means, means for receiving the compressed second image data transferred from the memory means through said second bus, when receiving said fifth acknowledge signal in response to said fifth data transfer request signal, means for expanding said compressed second image data to generate a second image data, fourth register means for temporarily holding the second image data, fourth detecting means for detecting a fourth state of the fourth register means, in which the fourth register means holds the second image data, sixth acknowledge signal receiving means for receiving a sixth acknowledge signal from said second-bus control unit in response to said sixth data transfer request signal sent from the sixth data transfer request signal sending means, and means for transferring the second image data to the memory means through said second bus to store the second expanded image data in the memory means, when receiving said sixth acknowledge signal in response to the sixth data transfer request signal, said fifth data transfer request signal sending means in said expansion unit sends the fifth data transfer request signal to the second-bus control means, when receiving said expansion command, and said sixth data transfer request signal sending means in said expansion unit sends the sixth data transfer request signal to the second-bus control means, when the fourth detecting means detects the fourth state;

said image output unit comprising, fifth and sixth data ports, output command receiving means for receiving an output command from the central processing unit, acknowledge signal receiving means for receiving the acknowledge signal from said second-bus control unit in response to said data transfer request signal sent from the data transfer request signal sending means in the image output input unit, and means for receiving the second image data transferred from the memory means through said fifth data port and said second bus to which the fifth data port is connected, when receiving said acknowledge signal by the acknowledge signal receiving means in the image output unit, and means for outputting said second image data through the sixth data port, said data transfer request signal sending means in said image output unit sends the data transfer request signal to the second-bus control means, when receiving said output command;

said central processing unit comprising, compression command sending means for sending the compression command to said compression unit when said first image data is stored in the memory means, communication command sending means for sending the communication command to said communication control unit when said compressed first image data is stored in the memory means, expansion command sending means for sending the expansion command to said expansion unit when said compressed second image data is stored in the memory means, and output command sending means for sending the output command to said image output unit when said second image data is stored in the memory means.

5. A facsimile terminal apparatus according to claim 4, wherein the operation of said acknowledged unit determining means being performed periodically; and said facsimile terminal apparatus further comprising a latch means for latching information on the acknowledged unit determined by the acknowledged unit determining means, for each period of the operation of said acknowledged unit determining means, and supplying the latched information to said DMA control means, said acknowledge signal sending means, and said gate control means.

6. A facsimile terminal apparatus according to claim 4, wherein said DMA control means comprises:

address generating means for generating an address signal to be supplied to the memory means for controlling the memory means in the data transfer operation; and control signal generating means for generating control signals to be supplied to the memory means for controlling the memory means in the data transfer operation.

7. An integrated circuit formed on a semiconductor substrate, comprising:

a first bus, a second bus, a first port connected to the first bus, second, third, fourth, and fifth ports connected to the second bus, a plurality of bus slave units respectively connected to the second bus, second-bus control means connected with each of the plurality of bus slave units and the first port, and bus connect/isolate gate means connected with the first and second buses and the second-bus control means, each of the plurality of bus slave units comprising a data transfer request signal sending means for sending a data transfer request signal to the second-bus control means when each of the plurality of bus slave unit has a demand to transmit or receive data through the second bus;

said bus connect/isolate gate means being able to isolate the first bus from the second bus, or to connect the first bus with the second bus, under control of the second-bus control means;

said second-bus control means comprising:

request signal receiving means for receiving the data transfer request signal from each of the plurality of bus slave units, and a bus request signal received through the first port;

acknowledge request determining means for determining one of the data transfer request signals from the plurality of bus slave units and the bus request signal from the first port, as an acknowledged request signal;

acknowledge signal sending means for sending an acknowledge signal to one of the plurality of bus slave units and the first port, from which said one of the data transfer request signals and the bus request signal, which is determined as the acknowledged request signal in said acknowledge request determining means, is received by said request signal receiving means; and gate control means for making the bus connect/isolate gate connect the first bus with the second bus when the acknowledge request is received from the first port, and making the bus connect/isolate gate isolate the first bus from the second bus when the acknowledge request is received from one of the plurality of bus slave units;

said integrated circuit further comprising DMA control means, connected to said second bus, for controlling memory means, when the memory means is connected to the second port, so that data transfer between the memory means and one of said bus slave units from which the acknowledged request signal is received, is performed through said second bus by a direct memory access operation when said acknowledged request determining means determines the acknowledged request signal;

said plurality of bus slave units including a read-in image input unit, an image output unit, a compression unit, an expansion unit, and a communication control unit;

said data transfer request signal sending means in said compression unit comprises first data transfer request signal sending means for sending a first data transfer request signal to the second-bus control means, and a second data transfer request signal sending means for sending a second data transfer request signal to the second-bus control means, said data transfer request signal sending means in said communication control unit comprises third data transfer request signal sending means for sending a third data transfer request signal to the second-bus control means, and a fourth data transfer request signal sending means for sending a fourth data transfer request signal to the second-bus control means, said data transfer request signal sending means in said expansion unit comprises fifth data transfer request signal sending means for sending a fifth data transfer request signal to the second-bus control means, and a sixth data transfer request signal to the second-bus control means;

said read-in image input unit comprising:
 a sixth port connected to said third port,
 a seventh port,
 a means for inputting image data through the third and sixth ports,
 first register means for temporarily holding the image data,
 first detecting means for detecting a first state of the first register means, in which the first register means holds the image data,
 means for receiving the acknowledge signal from said second-bus control means in response to said data transfer request signal sent from the data transfer request signal sending means in the read-in image input unit, and
 means for transferring the image data to the memory means, when the memory means is connected to the second port, through said seventh port and said second bus to which the seventh port is connected, to store the image data in the memory means as a first image data, when receiving said acknowledge signal by said acknowledge signal receiving means in the read-in image input unit,
 said data transfer request signal sending means in said read-in image input unit sends the data transfer request signal to the second-bus control means, when said first detecting means detects said first state;

said compression unit comprising:
 means for receiving a compression command from the first port through the first and second buses and the bus connect/isolate means,
 first acknowledge signal receiving means for receiving a first acknowledge signal from said second-bus control means in response to said first data transfer request signal sent from the first data transfer request signal sending means,
 means for receiving the first image data transferred from the memory means through said second bus, when receiving said first acknowledge signal,
 means for compressing said first image data,
 second register means for temporarily holding the compressed first image data,
 second detecting means for detecting a second state of the second register means, in which the second register means holds the compressed first image data,
 second acknowledge signal receiving means for receiving a second acknowledge signal from said second-bus control means in response to said second data transfer request signal sent from the second data transfer request signal sending means, and
 means for transferring the compressed first image data to the memory means, when the memory means is connected to the second port, through said second bus, to store the compressed first image data in the memory means, when receiving said second acknowledge signal,
 said first data transfer request signal sending means in said compression unit sends the first data transfer request signal to the second-bus control means, when receiving said compression command, and
 said second data transfer request signal sending means in said compression unit sends the second data transfer request signal to the second-bus control means, when said second detecting means detects said second state;

said communication control unit comprising,
 an eighth port,
 a ninth port connected to the fifth port,
 transmission command receiving means for receiving a transmission command from the first port through the first and second buses and the bus connect/isolate means, third acknowledge signal receiving means for receiving a third acknowledge signal from said second-bus control means in response to said third data transfer request signal sent from the third data transfer request signal sending means, means for receiving the compressed first image data transferred from the memory means, when the memory means is connected to the second port, through said eighth port and said second bus to which the eighth port is connected, when receiving said third acknowledge signal in response to said third data transfer request signal, means for transmitting said compressed first image data through the ninth and fifth ports, means for receiving said a compressed second image data through the ninth and fifth ports, third register means for temporarily holding the compressed second image data, third detecting means for detecting a third state of the third register means, in which the third register means holds the compressed second image data, fourth acknowledge signal receiving means for receiving a fourth acknowledge signal from said second-bus control means in response to said fourth data transfer request signal sent from the fourth data transfer request signal sending means, and means for transferring the compressed second image data to the memory means through said second bus to store the compressed second image data in the memory means, when receiving said fourth acknowledge signal, said third data transfer request signal sending means in said communication control unit sends the third data transfer request signal to the second-bus control means, when receiving said transmission command, and said fourth data transfer request signal sending means in said communication control unit sends the fourth data transfer request signal to the second-bus control means, when said third detecting means detects said third state;

said expansion unit comprising:

means for receiving an expansion command from the first port through the first and second buses and the bus connect/isolate means, fifth acknowledge signal receiving means for receiving a fifth acknowledge signal from said second-bus control means in response to said fifth data transfer request signal sent from the fifth data transfer request signal sending means, means for receiving the compressed second image data transferred from the memory means, when the memory means is connected to the second port, through said second bus, when receiving said fifth acknowledge signal in response to said fifth data transfer request signal, means for expanding said compressed second image data to generate a second image data, fourth register means for temporarily holding the second image data, fourth detecting means for detecting a fourth state of the fourth register means, in which the fourth register means holds the second image data, sixth acknowledge signal receiving means for receiving a sixth acknowledge signal from said second-bus control unit in response to said sixth data transfer request signal sent from the sixth data transfer request signal sending means, and means for transferring the second image data to the memory means through said second bus to store the second expanded image data in the memory means, when receiving said sixth acknowledge signal in response to the sixth data transfer request signal, said fifth data transfer request signal sending means in said expansion unit sends the fifth data transfer request signal to the second-bus control means, when receiving said expansion command, and said sixth data transfer request signal sending means in said expansion unit sends the sixth data transfer request signal to the second-bus control means, when the fourth detecting means detects the fourth state;

said image output unit comprising:

a tenth port, an eleventh port connected to said fourth port, output command receiving means for receiving an output command from the first port through the first and second buses and the bus connect/isolate means, acknowledge signal receiving means for receiving the acknowledge signal from said second-bus control unit in response to said data transfer request signal sent from the data transfer request signal sending means in the image output input unit, and means for receiving the second image data transferred from the memory means, when the memory means is connected to the second port, through said tenth port and said second bus to which the sixth port is connected, when receiving said acknowledge signal by the acknowledge signal receiving means in the image output unit, and means for outputting said second image data through the eleventh and fourth ports, said data transfer request signal sending means in said image output unit sends the data transfer request signal to the second-bus control means, when receiving said output command.

8. A facsimile terminal apparatus comprising:

one first and at least one second integrated circuits each formed on a semi-conductor substrate, and each of the first and at least one second integrated circuits comprising:

a first bus, a second bus, a first port connected to the first bus, second, third, fourth, and sixth ports connected to the second bus, a plurality of bus slave units respectively connected to the second bus, second-bus control means connected with each of the plurality of bus slave units and the first port, and bus connect/isolate gate means connected with the first and second buses and the second-bus control means;
each of the plurality of bus slave units comprising a data transfer request signal sending means for sending a data transfer request signal to the second-bus control means when each of the plurality of bus slave units has a demand to transmit or receive data through the second bus;
said bus connect/isolate gate means being able to isolate the first bus from the second bus, or to connect the first bus with the second bus, under control of the second-bus control means;
said second-bus control means comprising:
request signal receiving means for receiving the data transfer request signal from each of the plurality of bus slave units, and a bus request signal from the first port;
acknowledge request determining means for determining one of the data transfer request signals from the plurality of bus slave units and the bus request signal from the first port, as an acknowledged request signal;
acknowledge signal sending means for sending an acknowledge signal to one of the plurality of bus slave units and the first port, from which said one of the data transfer request signals and the bus request signal, which is determined as the acknowledged request signal in said acknowledge request determining means, is received by said request signal receiving means; and
gate control means for making the bus connect/isolate gate connect the first bus with the second bus when the acknowledge request is received from the first port, and making the bus connect/isolate gate isolate the first bus from the second bus when the acknowledge request is received from one of the plurality of bus slave units;
said integrated circuit further comprising a DMA control means, connected to said second bus, for controlling memory means, when the memory means is connected to the second port, so that data transfer between the memory means and one of said bus slave units from which the acknowledge request signal is received, is performed through said second bus by a direct memory access operation when said acknowledged request determining means determines the acknowledged request signal;
said plurality of bus slave units including a read-in image input unit, an image output unit, a compression unit, an expansion unit, and a communication control unit;
said facsimile terminal apparatus further comprising:
a first central processing unit connected to the first port of the first integrated circuit,
at least one second central processing unit respectively connected to the first port of each of the second integrated circuits,
first memory means connected to the first port of the first integrated circuit, and
at least one second memory means respectively connected to the first port of each of the at least one second integrated circuits;
in each of said first and at least one second integrated circuits,
said data transfer request signal sending means in said compression unit comprises first data transfer request signal sending means for sending a first data transfer request signal to the second-bus control means, and a second data transfer request signal sending means for sending a second data transfer request signal to the second-bus control means,
said data transfer request signal sending means in said communication control unit comprises third data transfer request signal sending means for sending a third data transfer request signal to the second-bus control means, and a fourth data transfer request signal sending means for sending a fourth data transfer request signal to the second-bus control means,
said data transfer request signal sending means in said expansion unit comprises fifth data transfer request signal sending means for sending a fifth data transfer request signal to the second-bus control means, and a sixth data transfer request signal sending means for sending a sixth data transfer request signal to the second-bus control means;
said read-in image input unit comprising:
a sixth port connected to said third port,
a seventh port,
means for inputting image data through the third and sixth ports,
first register means for temporarily holding the image data,
first detecting means for detecting a first state of the first register means, in which the first register means holds the image data,
means for receiving the acknowledge signal from said second-bus control means in response to said data transfer request signal sent from the data transfer request signal sending means in the read-in image input unit, and
means for transferring the image data to one of the first and at least one second memory means, which is connected to the second port of said each of the first and at least one second integrated circuits, through said seventh port and said second bus to which the seventh port is connected, to store the image data in the memory means as a first image data, when receiving said acknowledge signal by said acknowledge signal receiving means in the read-in image input unit,
said data transfer request signal sending means in said read-in image input unit sends the data transfer request signal to the second-bus control means, when said first detecting means detects said first state;
said compression unit comprising:
means for receiving a compression command from the first port through the first and second buses and the bus connect/isolate means,
first acknowledge signal receiving means for receiving a first acknowledge signal from said second-bus control unit in response to said first data transfer request signal sent from the first data transfer request signal sending means,
means for receiving the first image data transferred from the memory means through said second bus, when receiving said first acknowledge signal,
means for compressing said first image data, second register means for temporarily holding the compressed first image data, second detecting means for detecting a second state of the second register means, in which the second register means holds the compressed first image data, second acknowledge signal receiving means for receiving a second acknowledge signal from said second-bus control means in response to said second data transfer request signal sent from the second data transfer request signal sending means, and means for transferring the compressed first image data to one of the first and at least one second memory means, which is connected to the second port of said each of the first and at least one second integrated circuits, through said second bus, to store the compressed first image data in the memory means, when receiving said second acknowledge signal, said first data transfer request signal sending means in said compression unit sends the first data transfer request signal to the second-bus control means, when receiving said compression command, and said second data transfer request signal sending means in said compression unit sends the second data transfer request signal to the second-bus control means, when said second detecting means detects said second state;

said communication control unit comprising:

an eighth port, a ninth port connected to the fifth port, transmission command receiving means for receiving a transmission command from the first port through the first and second buses and the bus connect/isolate means, third acknowledge signal receiving means for receiving a third acknowledge signal from said second-bus control unit in response to said third data transfer request signal sent from the third data transfer request signal sending means, means for receiving the compressed first image data transferred from one of the first and at least one second memory means, which is connected to the second port of said each of the first and at least one second integrated circuits, through said eighth port and said second bus to which the eighth port is connected, when receiving said third acknowledge signal in response to said third data transfer request signal, means for transmitting said compressed first image data through the ninth port, means for receiving said a compressed second image data through the ninth port, third register means for temporarily holding the compressed second image data, third detecting means for detecting a third state of the third register means, in which the third register means holds the compressed second image data, fourth acknowledge signal receiving means for receiving a fourth acknowledge signal from said second-bus control means in response to said fourth data transfer request signal sent from the fourth data transfer request signal sending means, and means for transferring the compressed second image data to the memory means through said second bus to store the compressed second image data in the memory means, when receiving said fourth acknowledge signal, said third data transfer request signal sending means in said communication control unit sends the third data transfer request signal to the second-bus control means, when receiving said transmission command, and said fourth data transfer request signal sending means in said communication control unit sends the fourth data transfer request signal to the second-bus control means, when said third detecting means detects said third state;

said expansion unit comprising:

means for receiving an expansion command from the first port through the first and second buses and the bus connect/isolate means, fifth acknowledge signal receiving means for receiving a fifth acknowledge signal from said second-bus control unit in response to said fifth data transfer request signal sent from the fifth data transfer request signal sending means, means for receiving the compressed second image data transferred from one of the first and at least one second memory means, which is connected to the second port of said each of the first and at least one second integrated circuits, through said second bus, when receiving said fifth acknowledge signal in response to said fifth data transfer request signal, means for expanding said compressed second image data to generate a second image data, fourth register means for temporarily holding the second image data, fourth detecting means for detecting a fourth state of the fourth register means, in which the fourth register means holds the second image data, sixth acknowledge signal receiving means for receiving a sixth acknowledge signal from said second-bus control unit in response to said sixth data transfer request signal sent from the sixth data transfer request signal sending means, and means for transferring the second image data to the memory means through said second bus to store the second expanded image data in the memory means, when receiving said sixth acknowledge signal in response to the sixth data transfer request signal, said fifth data transfer request signal sending means in said expansion unit sends the fifth data transfer request signal to the second-bus control means, when receiving said expansion command, and said sixth data transfer request signal sending means in said expansion unit sends the sixth data transfer request signal to the second-bus control means, when the fourth detecting means detects the fourth state;

said image output unit comprising:

a tenth port, an eleventh port connected to said fourth port, output command receiving means for receiving an output command from the first port through the first and second buses and the bus connect/isolate means, acknowledge signal receiving means for receiving the acknowledge signal from said second-bus control unit in response to said data transfer request signal sent from the data transfer request signal sending means in the image output input unit, and means for receiving the second image data transferred from one of the first and at least one second memory means, which is connected to the second port of said each of the first and at least one second integrated circuits, through said tenth port and said second bus to which the sixth port is connected, when receiving said acknowledge signal by the acknowledge signal receiving means in the image output unit, and means for outputting said second image data through the eleventh and fought ports, said data transfer request signal sending means in said image output unit sends the data transfer request signal to the second-bus control means, when receiving said output command;

said ninth port of the communication control unit in the first integrated circuit is connected to the third and fourth ports of the second integrated circuit so that the compressed image data transmitted from the communication control unit in the first integrated circuit is input through the third port of the second integrated circuit, and the image data output from the fourth port of the second integrated circuit is received through the ninth port of the communication control unit in the first integrated circuit by the communication control unit in the first integrated circuit.

* * * * *